United States Patent
Yang et al.

(10) Patent No.: US 11,754,716 B2
(45) Date of Patent: Sep. 12, 2023

(54) ENCODING LIDAR SCANNED DATA FOR GENERATING HIGH DEFINITION MAPS FOR AUTONOMOUS VEHICLES

(71) Applicant: NVIDIA Corporation, Santa Clara, CA (US)

(72) Inventors: Lin Yang, San Carlos, CA (US); Mark Damon Wheeler, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 101 days.

(21) Appl. No.: 17/646,293

(22) Filed: Dec. 28, 2021

(65) Prior Publication Data

US 2022/0373687 A1    Nov. 24, 2022

Related U.S. Application Data

(63) Continuation of application No. 16/524,696, filed on Jul. 29, 2019, now Pat. No. 11,209,548, which is a
(Continued)

(51) Int. Cl.
*G01S 17/89* (2020.01)
*H04N 19/17* (2014.01)
(Continued)

(52) U.S. Cl.
CPC ............ *G01S 17/89* (2013.01); *G01C 21/30* (2013.01); *G01C 21/3841* (2020.08);
(Continued)

(58) Field of Classification Search
CPC .......... G01S 17/89; G01S 17/86; G01S 17/90; G01S 17/931; G01C 21/30;
(Continued)

(56) References Cited

U.S. PATENT DOCUMENTS 6,868,421 B1 * 3/2005 Lin .................. G06F 16/29
                                                707/E17.006
7,254,271 B2 * 8/2007 Areas ................ G06V 30/422
                                                382/253
(Continued)

FOREIGN PATENT DOCUMENTS

CN       101290228 A      10/2008
CN       102168983 A       8/2011
(Continued)

OTHER PUBLICATIONS

Marius Dupuis E.A., "OpenDRIVE® Format Specification, Rev. 1.4," VIRES Simulationstechnologie GmbH, vol. VI2014.106, Issue H, pp. 1-103 (Nov. 4, 2015).
(Continued)

*Primary Examiner* — Mahendra R Patel
(74) *Attorney, Agent, or Firm* — Maschoff Brennan

(57) ABSTRACT

Embodiments relate to methods for efficiently encoding sensor data captured by an autonomous vehicle and building a high definition map using the encoded sensor data. The sensor data can be LiDAR data which is expressed as multiple image representations. Image representations that include important LiDAR data undergo a lossless compression while image representations that include LiDAR data that is more error-tolerant undergo a lossy compression. Therefore, the compressed sensor data can be transmitted to an online system for building a high definition map. When building a high definition map, entities, such as road signs and road lines, are constructed such that when encoded and compressed, the high definition map consumes less storage space. The positions of entities are expressed in relation to a reference centerline in the high definition map. Therefore, each position of an entity can be expressed in fewer numerical digits in comparison to conventional methods.

18 Claims, 14 Drawing Sheets

Related U.S. Application Data continuation of application No. 15/857,417, filed on Dec. 28, 2017, now Pat. No. 10,401,500.

(60) Provisional application No. 62/441,065, filed on Dec. 30, 2016.

(51) Int. Cl.

| | | |
|---|---|---|
| *G01C 21/30* | (2006.01) | |
| *G06T 9/00* | (2006.01) | |
| *G01S 17/86* | (2020.01) | |
| *G01S 17/90* | (2020.01) | |
| *G01S 17/931* | (2020.01) | |
| *G06V 20/58* | (2022.01) | |
| *G06V 20/56* | (2022.01) | |
| *G01C 21/00* | (2006.01) | |
| *G06T 9/20* | (2006.01) | |
| *G05D 1/02* | (2020.01) | |
| *G06F 16/174* | (2019.01) | |
| *B60R 11/04* | (2006.01) | |
| *G01C 11/02* | (2006.01) | |

(52) U.S. Cl.
CPC ..... *G01C 21/3848* (2020.08); *G01C 21/3867* (2020.08); *G01S 17/86* (2020.01); *G01S 17/90* (2020.01); *G01S 17/931* (2020.01); *G06T 9/001* (2013.01); *G06T 9/20* (2013.01); *G06V 20/582* (2022.01); *G06V 20/584* (2022.01); *G06V 20/588* (2022.01); *H04N 19/17* (2014.11); *B60R 11/04* (2013.01); *G01C 11/025* (2013.01); *G05D 1/0274* (2013.01); *G05D 2201/0213* (2013.01); *G06F 16/1744* (2019.01)

(58) Field of Classification Search
CPC ............ G01C 21/3841; G01C 21/3848; G01C 21/3867; G01C 11/025; G01C 21/3874; G06T 9/001; G06T 9/20; G06V 20/582; G06V 20/584; G06V 20/588; H04N 19/17; B60R 11/04; G05D 1/0274; G05D 2201/0213; G06F 16/1744
USPC .......................................................... 382/232
See application file for complete search history.

(56) References Cited

U.S. PATENT DOCUMENTS

| | | | | |
|---|---|---|---|---|
| 7,502,490 B2 * | 3/2009 | Rhoads | ................ | G06T 1/0021 |
| | | | | 345/522 |
| 7,643,673 B2 * | 1/2010 | Rohlf | ................ | G06F 16/9537 |
| | | | | 382/285 |
| 8,323,106 B2 * | 12/2012 | Zalewski | ............... | A63F 13/215 |
| | | | | 463/31 |
| 8,447,064 B2 * | 5/2013 | Rhoads | ................ | G06F 16/29 |
| | | | | 382/113 |
| 8,527,199 B1 * | 9/2013 | Burnette | ............. | G01C 21/3848 |
| | | | | 701/425 |
| 9,170,115 B2 | 10/2015 | Kim | | |
| 9,195,290 B2 * | 11/2015 | Siliski | ............... | H04M 1/72454 |
| 9,646,415 B2 * | 5/2017 | Hanson | ................... | G06F 18/40 |
| 2001/0043745 A1 * | 11/2001 | Friederich | .......... | H03M 7/3084 |
| | | | | 382/232 |
| 2005/0137798 A1 * | 6/2005 | Furukawa | ............... | G01C 21/26 |
| | | | | 701/410 |
| 2005/0288836 A1 * | 12/2005 | Glass | ................... | G09B 29/106 |
| | | | | 382/293 |
| 2007/0002040 A1 * | 1/2007 | Oldroyd | ................. | G06T 17/05 |
| | | | | 345/419 |
| 2009/0228204 A1 * | 9/2009 | Zavoli | .................... | G01C 21/30 |
| | | | | 701/532 |
| 2010/0157280 A1 | 6/2010 | Kusevic et al. | | |
| 2010/0292886 A1 * | 11/2010 | Szczerba | .............. | G01S 13/723 |
| | | | | 701/31.4 |
| 2011/0202273 A1 * | 8/2011 | Nogtev | .............. | G01C 21/3881 |
| | | | | 707/693 |
| 2012/0124113 A1 | 5/2012 | Zalik et al. | | |
| 2014/0358436 A1 * | 12/2014 | Kim | ................... | G01C 21/3822 |
| | | | | 701/532 |
| 2015/0219767 A1 * | 8/2015 | Humphreys | .......... | G01S 19/485 |
| | | | | 342/357.26 |
| 2016/0122038 A1 * | 5/2016 | Fleischman | ........... | B64C 39/024 |
| | | | | 244/114 R |
| 2016/0155250 A1 * | 6/2016 | Chen | .................. | G01C 21/3815 |
| | | | | 345/440 |
| 2016/0241864 A1 * | 8/2016 | Loyd | ................... | H04N 21/4524 |
| 2017/0024877 A1 * | 1/2017 | Versace | ..................... | G01S 5/16 |
| 2017/0116477 A1 * | 4/2017 | Chen | ............... | G01C 21/3819 |
| 2017/0248963 A1 * | 8/2017 | Levinson | ................ | G01C 21/26 |
| 2018/0082438 A1 * | 3/2018 | Simon | .................... | G01C 21/26 |

FOREIGN PATENT DOCUMENTS

| | | | | |
|---|---|---|---|---|
| CN | 104210439 A | 12/2014 | | |
| CN | 105551284 A | 5/2016 | | |
| CN | 105783936 A | 7/2016 | | |
| EP | 1 939 837 A2 | 7/2008 | | |
| EP | 1840523 B1 * | 3/2011 | .......... | G01C 21/362 |
| EP | 2 927 875 A2 | 10/2015 | | |
| JP | 4079489 B2 * | 4/2008 | ............. | G01C 21/32 |
| WO | 2005/038402 A1 | 4/2005 | | |
| WO | WO-2005089397 A2 * | 9/2005 | .......... | G09B 29/106 |
| WO | WO-2008044927 A1 * | 4/2008 | ............. | G01C 11/02 |
| WO | 2009/045096 A1 | 4/2009 | | |
| WO | WO-2009098154 A1 * | 8/2009 | ............. | G01C 21/30 |
| WO | WO-2016130719 A2 * | 8/2016 | ............. | B60W 30/10 |
| WO | WO-2017021474 A1 * | 2/2017 | ............. | G01C 21/28 |

OTHER PUBLICATIONS

Heiko G. Seif, et al., "Autonomous Driving in the iCity—HD Maps as a Key Challenge of the Automotive Industry," Engineering, vol. 2, Issue 2, pp. 159-162 (Jun. 23, 2016).

China Office Action dated Feb. 28, 2023 as received in Application No. 201780085909.3.

* cited by examiner

ENCODING LIDAR SCANNED DATA FOR GENERATING HIGH DEFINITION MAPS FOR AUTONOMOUS VEHICLES

CROSS-REFERENCE TO RELATED APPLICATIONS

This application is a continuation of U.S. patent application Ser. No. 16/524,696, filed on Jul. 29, 2019, which is a continuation of U.S. patent application Ser. No. 15/857,417, filed on Dec. 28, 2017, which claims the benefit of Provisional U.S. Application No. 62/441,065, filed Dec. 30, 2016, all of which are incorporated herein by reference in their entireties.

BACKGROUND

This disclosure relates generally to maps for autonomous vehicles, and more particularly to encoding data for generating high definition maps with high precision for safe navigation of autonomous vehicles.

Autonomous vehicles, also known as self-driving cars, driverless cars, auto, or robotic cars, drive from a source location to a destination location without requiring a human driver to control and navigate the vehicle. Automation of driving is difficult due to several reasons. For example, autonomous vehicles use sensors to make driving decisions on the fly, but vehicle sensors cannot observe everything all the time. Vehicle sensors can be obscured by corners, rolling hills, and other vehicles. Vehicles sensors may not observe certain things early enough to make decisions. In addition, lanes and signs may be missing on the road or knocked over or hidden by bushes, and therefore not detectable by sensors. Furthermore, road signs for rights of way may not be readily visible for determining from where vehicles could be coming, or for swerving or moving out of a lane in an emergency or when there is a stopped obstacle that must be passed.

Autonomous vehicles can use map data to determine some of the above information instead of relying on sensor data. However conventional maps have several drawbacks that make them difficult to use for an autonomous vehicle. For example maps do not provide the level of accuracy required for safe navigation (e.g., 10 cm or less). GPS systems provide accuracies of approximately 3-5 meters, but have large error conditions resulting in an accuracy at distances over 100 m. This makes it challenging to accurately determine the location of the vehicle.

Furthermore, conventional maps are created by survey teams that use drivers with specially outfitted cars with high resolution sensors that drive around a geographic region and take measurements. The measurements are taken back and a team of map editors assembles the map from the measurements. This process is expensive and time consuming (e.g., taking possibly months to complete a map). Therefore, maps assembled using such techniques do not have fresh data. For example, roads are updated/modified on a frequent basis roughly 5-10% per year. But survey cars are expensive and limited in number, so cannot capture most of these updates. For example, a survey fleet may include a thousand cars. For even a single state in the United States, a thousand cars would not be able to keep the map up-to-date on a regular basis to allow safe self-driving. As a result, conventional techniques of maintaining maps are unable to provide the right data that is sufficiently accurate and up-to-date for safe navigation of autonomous vehicles.

SUMMARY

Embodiments relate to the collecting, processing, and efficient encoding of sensor data. Although the subsequent description refers specifically to the encoding of sensor data that can be used to generate a HD map for autonomous vehicles, the encoding and compression techniques described herein can also be applied a variety of other scenarios including encoding and compressing sensor data gathered in indoor environments (e.g., for the navigation of robots in an indoor setting). In various embodiments, sensor data is gathered and encoded by autonomous vehicles, such that the encoded sensor data can be transmitted between vehicles and an online system (e.g., the cloud) that generates HD map. Here, sensor data gathered by autonomous vehicles can be three dimensional data gathered by light detection and ranging (LiDAR) methods. In particular embodiments, the autonomous vehicle processes the sensor data by representing the LiDAR sensor data as images. Each pixel in an image representation represents a location of the environment around the autonomous vehicle. Each pixel value of an image representation represents a range value or an intensity value at that location of the environment represented by the pixel.

In various embodiments, the autonomous vehicle represents the range value and intensity value as one or more bytes and generates an image representation for each byte of the range value and intensity value. For example, the range value can be expressed as two bytes and the intensity value can be expressed as one byte. This enables the expression of range values and intensity values at a desired precision. In various embodiments, the autonomous vehicle generates three image representations; a first image representation includes pixel values that represent the most significant byte of the range value, a second image representation includes pixel values that represent the least significant byte of the range value, and a third image representation includes the byte of the intensity value. The autonomous vehicle can perform a different type of compression on each image representation, based on the amount of tolerable error. For example, given that any deviation in the most significant byte of the range value leads to significant errors, the image representation that includes pixel values that represent the most significant byte of the range value undergoes lossless compression. As another example, given that deviations in the least significant byte of the range value leads to less critical errors, the image representation that includes pixel values that represent the least significant byte of the range value undergoes lossy compression. The third image representation that includes the byte of the intensity value can undergo either lossless or lossy compression depending on the tolerable error at that location.

Altogether, encoding and compressing sensor data (e.g., LiDAR) sensor data using the methods described hereafter achieves significantly improved compression ratios while minimizing the rate of error when generating the HD map. In particular examples, encoding and compressing the sensor data using the methods described hereafter achieves an 8% compression ratio while introducing minimal error (e.g., <2.5 cm at 99 percentile) when constructing the HD map.

Further embodiments relate to methods for generating a HD map with sub-2 cm resolution using the compressed sensor data. Therefore, an automated vehicle can use the HD map to understand, with great precision, where the automated vehicle is located and how to safely navigate in relation to entities within the HD map. Given the sheer amount of data that is required to achieve sub-2 cm resolution, the HD map expresses entities, such as road signs and line boundaries, within the HD map in relation to a reference centerline. Therefore, instead of expressing the positions of entities in the HD map using longitude or latitude coordinates, which require a significant number of digits to accurately represent a position, the positions of entities can be expressed in significantly fewer digits in relation to a reference centerline. Therefore, the positions of each entity, when encoded and compressed, consume far fewer resources (e.g., storage space and memory) in comparison to encoding and compressing positions of entities that are expressed using longitude or latitude coordinates. This is beneficial both for storage purposes and for transmission purposes as the HD map, which includes information as to the positions of entities in the HD map, can be efficiently provided to an automated vehicle to inform the driving path of the automated vehicle.

Figure 1:
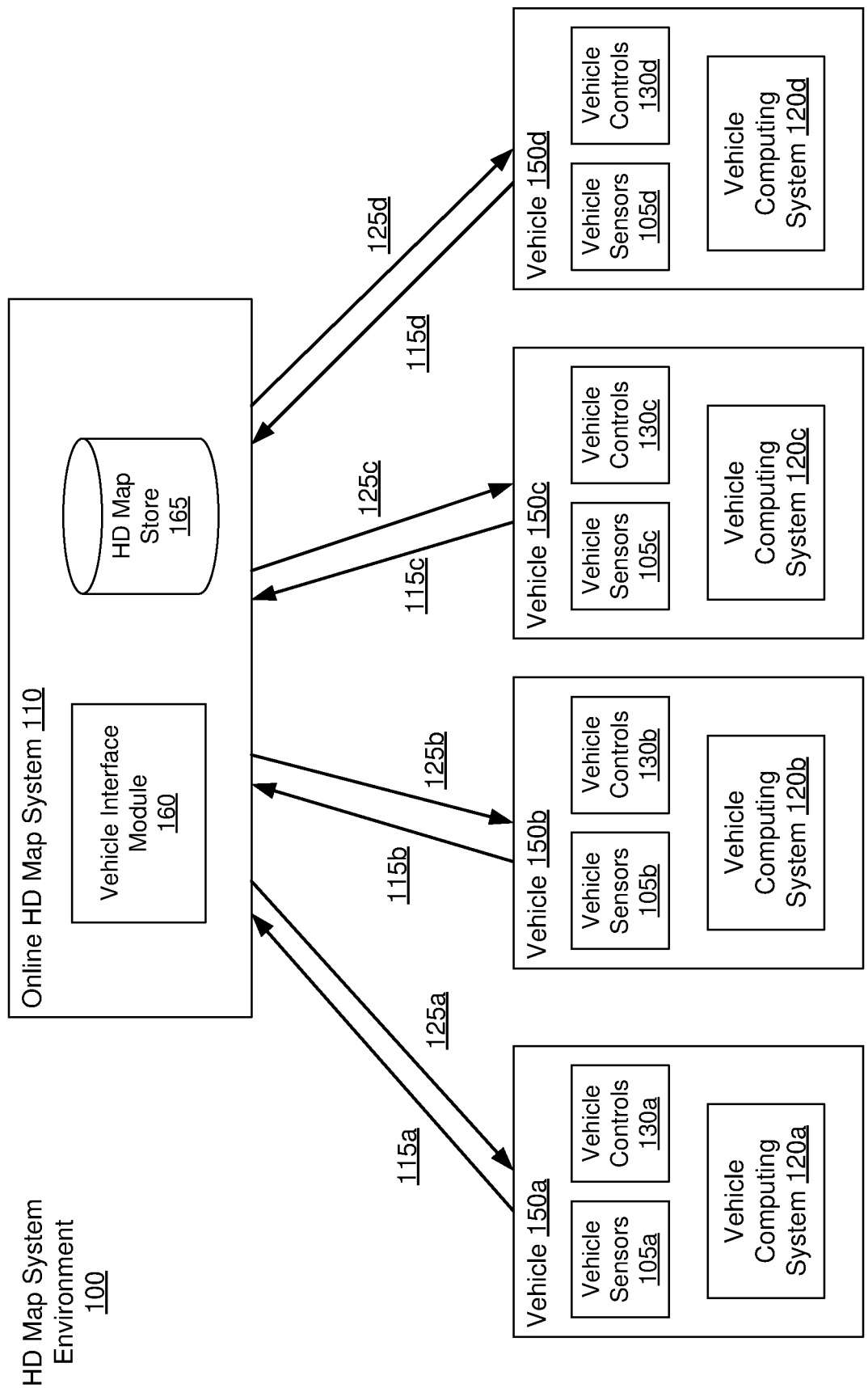
FIG. 1 shows the overall system environment of an HD map system interacting with multiple vehicle computing systems, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments of the invention maintain high definition (HD) maps containing highly precise, up-to-date information. The HD maps may be used by autonomous vehicles to safely navigate to their destinations without human input or with limited human input. An autonomous vehicle is a vehicle capable of sensing its environment and navigating without human input. Autonomous vehicles may also be referred to herein as "driverless car," "self-driving car," or "robotic car." An HD map refers to a map storing data with very high precision, typically 1-10 cm. Embodiments describe the generation of HD maps containing spatial geometric information (e.g., three dimensional positional data) about the roads on which an autonomous vehicle can travel. Accordingly, the generated HD maps include the information necessary for an autonomous vehicle to navigate safely without human intervention. Instead of collecting data for the HD maps using an expensive and time consuming mapping fleet process that requires the employment of multiple vehicles outfitted with high resolution sensors, embodiments of the invention use data from the lower resolution sensors of the self-driving vehicles themselves as they drive around through their environments. The vehicles may have no prior map data for these routes or even for the region. Embodiments of the invention provide location as a service (LaaS) such that autonomous vehicles of different manufacturers can each have access to the most up-to-date map information created via these embodiments of invention.

Overall System Environment

HD maps store a very large amount of information, and therefore face challenges when generating and managing the information for an HD map. For example, a system that gathers data for generating an HD map may face difficulties in transferring the substantial amount of data. Embodiments described herein relate to methods of gathering and compressing the sensor data such that the compressed sensor data can be readily transmitted for building the HD map.

Furthermore, once an online system builds the HD map using the compressed sensor data, the online system may face difficulties when storing or transmitting portions of the HD map to the vehicle. Given the immense amount of information stored in the HD map, there is a need to generate HD maps that most efficiently represent the needed information in an HD map. Embodiments described herein further relate to methods of expressing positions of entities (e.g., road signs, road lanes, zones, and the like) in relation to a reference centerline within geographical regions of the HD map. HD maps generated using this method consume reduced amounts of computational storage.

Once an HD map is generated, the HD map for a large geographic region may not fit on the local storage of a vehicle. Embodiments described herein further relate to methods of providing the necessary portion of an HD map to an autonomous vehicle that allows the vehicle to determine its current location in the HD map, determine the entities on the road relative to the vehicle's position, determine if it is safe to move the vehicle based on physical constraints and legal constraints, etc. Examples of physical constraints include physical obstacles, such as walls, and examples of legal constraints include legally allowed direction of travel for a lane, speed limits, yields, stops.

Embodiments of the invention allow safe navigation for an autonomous vehicle by providing high latency, for example, 10-20 milliseconds or less for providing a response to a request; high precision in terms of location, i.e., precision within 5 cm or less; freshness of data by ensuring that the map is updated to reflect changes on the road within a reasonable time frame; and storage efficiency by minimizing the storage needed for the HD Map.

FIG. 1 shows the overall system environment of an HD map system 110 interacting with multiple vehicles, according to an embodiment. The HD map system environment 100 includes an online HD map system 110 that interacts with a plurality of vehicles 150. The vehicles 150 may be autonomous vehicles but are not required to be. The online HD map system 110 receives sensor data captured by sensors of the vehicles, and combines the data received from the vehicles 150 to generate and maintain HD maps. The online HD map system 110 sends HD map data to the vehicles for use in driving the vehicles. In an embodiment, the online HD map system 110 is implemented as a distributed computing system, for example, a cloud based service that allows clients such as vehicle computing systems 120 to make requests for information and services. For example, a vehicle computing system 120 may make a request for HD map data for driving along a route and the online HD map system 110 provides the requested HD map data.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 5:
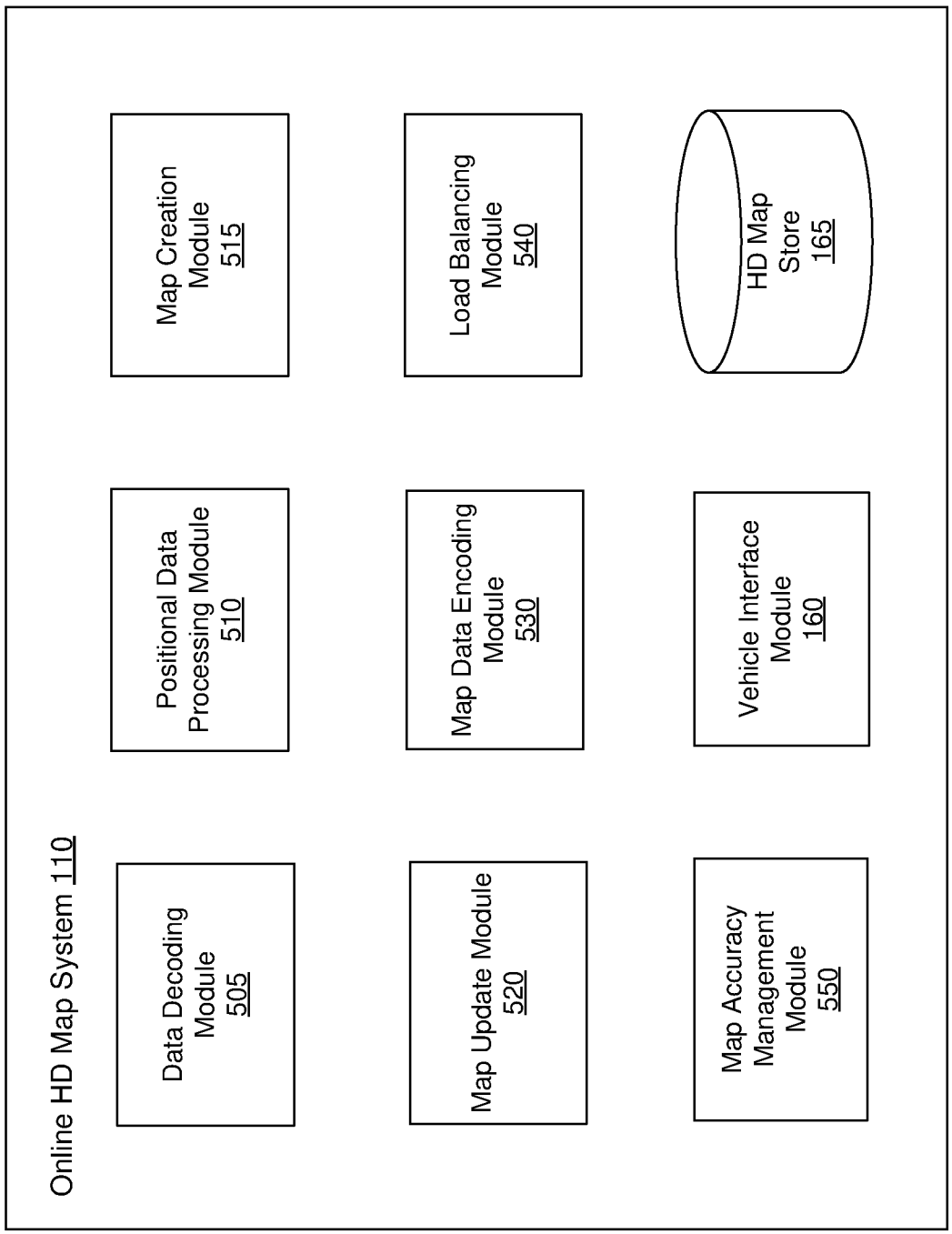
FIG. 5 shows the system architecture of an HD map system, according to an embodiment.

The online HD map system 110 comprises a vehicle interface module 160 and an HD map store 165. The online HD map system 110 interacts with the vehicle computing system 120 of various vehicles 150 using the vehicle interface module 160. The online HD map system 110 stores map information for various geographical regions in the HD map store 165. The online HD map system 110 may include other modules than those shown in FIG. 1, for example, various other modules as illustrated in FIG. 5 and further described herein.

The online HD map system 110 receives 115 data collected by sensors of a plurality of vehicles 150, for example, hundreds or thousands of cars. The vehicles processes sensor data captured while driving along various routes and send it to the online HD map system 110. The online HD map system 110 uses the data received from the vehicles 150 to create and update HD maps describing the regions in which the vehicles 150 are driving. The online HD map system 110 builds high definition maps based on the collective information received from the vehicles 150 and stores the HD map information in the HD map store 165.

The online HD map system 110 sends 125 HD maps to individual vehicles 150 as required by the vehicles 150. For example, if an autonomous vehicle needs to drive along a route, the vehicle computing system 120 of the autonomous vehicle provides information describing the route being travelled to the online HD map system 110. In response, the online HD map system 110 provides the required HD maps for driving along the route.

In an embodiment, the online HD map system 110 sends portions of the HD map data to the vehicles in a compressed format so that the data transmitted consumes less bandwidth. Generating the compressed format of the HD map data is described in further detail below in relation to FIGS. 9A and 9B. The online HD map system 110 receives from various vehicles, information describing the data that is stored at the local HD map store 375 of the vehicle. If the online HD map system 110 determines that the vehicle does not have a certain portion of the HD map stored locally in the local HD map store 375, the online HD map system 110 sends that portion of the HD map to the vehicle. If the online HD map system 110 determines that the vehicle did previously receive that particular portion of the HD map but the corresponding data was updated by the online HD map system 110 since the vehicle last received the data, the online HD map system 110 sends an update for that portion of the HD map stored at the vehicle. This allows the online HD map system 110 to minimize the amount of data that is communicated with the vehicle and also to keep the HD map data stored locally in the vehicle updated on a regular basis.

A vehicle 150 includes vehicle sensors 105, vehicle controls 130, and a vehicle computing system 120. The vehicle sensors 105 allow the vehicle 150 to detect the surroundings of the vehicle as well as information describing the current state of the vehicle, for example, information describing the location and motion parameters of the vehicle. The vehicle sensors 105 comprise a camera, a light detection and ranging sensor (LIDAR), a global positioning system (GPS) navigation system, an inertial measurement unit (IMU), and others. The vehicle has one or more cameras that capture images of the surroundings of the vehicle. A LIDAR surveys the surroundings of the vehicle by measuring distance to a target by illuminating that target with a laser light pulses, and measuring the reflected pulses. The GPS navigation system determines the position of the vehicle based on signals from satellites. An IMU is an electronic device that measures and reports motion data of the vehicle such as velocity, acceleration, direction of movement, speed, angular rate, and so on using a combination of accelerometers and gyroscopes or other measuring instruments.

The vehicle controls 130 control the physical movement of the vehicle, for example, acceleration, direction change, starting, stopping, and so on. The vehicle controls 130 include the machinery for controlling the accelerator, brakes, steering wheel, and so on. The vehicle computing system 120 continuously provides control signals to the vehicle controls 130, thereby causing an autonomous vehicle to drive along a selected route.

The vehicle computing system 120 performs various tasks including processing data collected by the sensors as well as map data received from the online HD map system 110. The vehicle computing system 120 also processes data for sending to the online HD map system 110. Details of the vehicle computing system are illustrated and further described in connection with FIG. 2A and FIG. 3.

The interactions between the vehicle computing systems 120 and the online HD map system 110 are typically performed via a network, for example, via the Internet. The network enables communications between the vehicle computing systems 120 and the online HD map system 110. In one embodiment, the network uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Processing LIDAR Scan Data

Figure 2A:
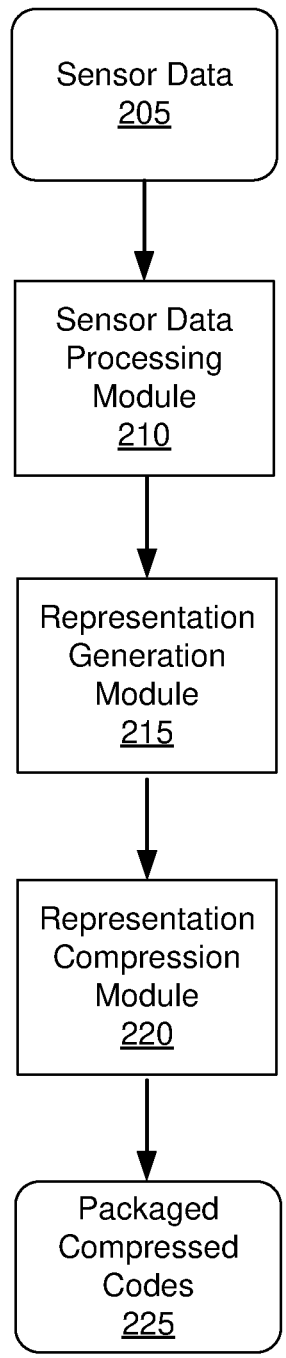
FIG. 2A depicts a general flow process for encoding gathered sensor data performed by the vehicle computing system, according to an embodiment.

FIG. 2A depicts a general flow process for encoding sensor data 205 performed by the vehicle computing system 120, according to an embodiment. Sensor data 205 refers to data captured by the vehicle sensors 105 of a vehicle 150. In particular embodiments, sensor data 205 is captured by a light detection and ranging (LiDAR) sensor of the vehicle 150. In some embodiments, sensor data 205 is captured by a camera, such as a colored camera, of the vehicle 150.

An example of a LiDAR vehicle sensor 105 of a vehicle 150 is the Velodyne HDL-64E S2. The LiDAR vehicle sensor 105 may be configured with different specifications. For example, specifications of a LiDAR vehicle sensor 105 refer to N number of lasers, a vertical/horizontal field of view, an angular resolution, a distance accuracy, a distance range (e.g., a distance range that is dependent on the reflectivity of objects in the surrounding environment), and a rate of data acquisition (e.g., M number of data points per second).

In various embodiments, the lasers of the LiDAR vehicle sensor 105 can have an adjustable pitch angle. In various embodiments, the adjustable pitch angle is between −24.8 degrees and +2 degrees. In various embodiments, the LiDAR vehicle sensor 105 further includes one or more calibration corrections (e.g., rotation correction, vertical offset correction, horizontal offset correction, yaw correction, rotation correction, vertical correction, distance correction).

In various embodiments, the sensor data 205 may be three dimensional data represented by the variables of (x, y, z, intensity). Here, x, y, z represent the three dimensional coordinates in a point cloud captured by the vehicle sensor 105. The intensity represents the intensity of a signal captured by a vehicle sensor 105. For example, the intensity can be the intensity of the laser light that reflected off of an object. In various embodiments, the sensor data 205 may be a point cloud represented by the variables of (pitch, yaw, range, intensity). Pitch and yaw each refer to an orientation of the vehicle sensor 105. The range refers to the distance from the vehicle sensor 105 to an object of interest, hereafter referred to as an entity, within the environment around the vehicle 150. As described above, the intensity represents the intensity of a signal captured by a vehicle sensor 105.

Returning to FIG. 2A, the sensor data 205 is provided to the sensor data processing module 210. In various embodiments, the sensor data 205 gathered by the LiDAR vehicle sensor 105 is represented by the variables of (x, y, z, intensity) and the sensor data processing module 210 converts the variables of (x, y, z, intensity) to the variables of (pitch, yaw, range, intensity).

In general, the process of converting the variables of (x, y, z, intensity) to the variables of (pitch, yaw, range, intensity) can be dependent on the specifications of the LiDAR vehicle sensor 105. For example, to perform the conversion of the variables, the sensor data processing module 210 determines calibration corrections based on the specifications of the vehicle sensor 105 by performing a first LiDAR scan. The determined calibration corrections can be used for subsequent scans in converting the variables of (x, y, z) to (pitch, yaw, range). In some embodiments, the sensor data processing module 210 performs a gradient descent, least squares regression, or a simple grid search to determine the variables of (pitch, yaw, range, intensity).

The sensor data processing module 210 obtains the variables of (pitch, yaw, range) converted from the (x, y, z) variables. The variables of (pitch, yaw, range, intensity) are hereafter referred to as sensor orientation data.

Image Representation of the Three Dimensional Data

Figure 2B:
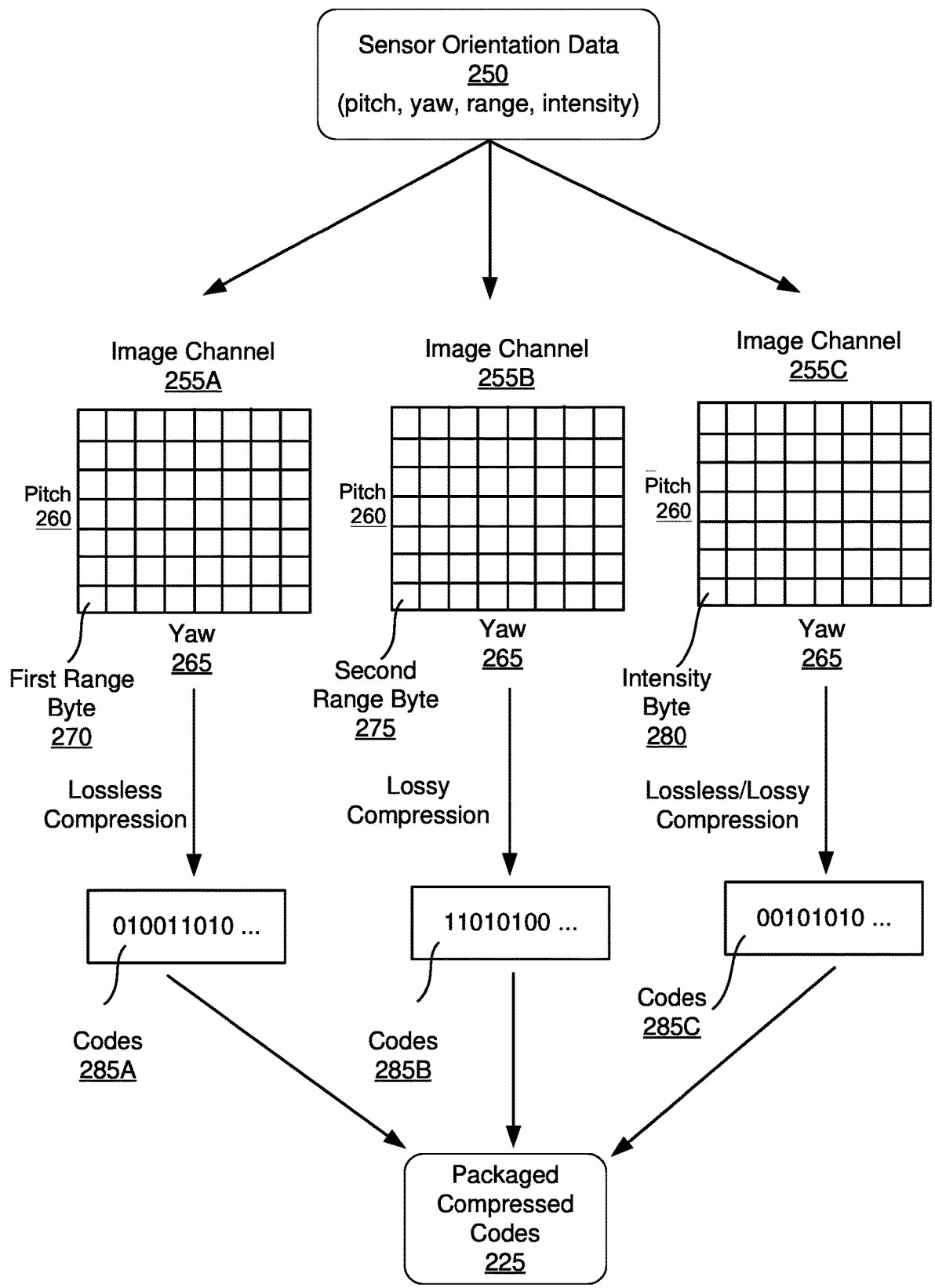
FIG. 2B is an illustrative depiction of the process for encoding sensor data, according to an embodiment.

The representation generation module 215 receives the sensor orientation data 250 in the form of (pitch, yaw, range, intensity) from the sensor data processing module 210 and generates image representations of the sensor orientation data 250. Thus, when provided to the representation compression module 220, the image representations can be efficiently compressed. Reference is made to FIG. 2B, which is an illustrative depiction of the process for encoding the sensor orientation data 250 into packaged compressed codes 225, according to an embodiment.

The representation generation module 215 represents the sensor orientation data 250 as different image representations, shown as image channels 255A, 255B, and 255C in FIG. 2B. Each image channel 255 includes individual pixels. In various embodiments, each pixel corresponds to a value of a pitch 260 and a value of a yaw 265. In other words, each pixel represents a location in the environment around the vehicle 150. As shown in FIG. 2B, each row of an image channel 255 is defined by pitch 260 (e.g., scan line index) and each column of the image channel 255 is defined by yaw 265 (e.g., rotation angle).

The structure of each image channel 255 can be dependent on the specifications of the sensor 105 of the vehicle 150 that captured the three dimensional data. For example, an image channel 255 can have N number of rows, each row corresponding to one of the N number of lasers. As another example, the image channel 255 can have a total number of columns that is dependent on the field of view and/or an angular resolution. For example, an image channel 255 can have 4000 columns given a field of view of 360 degrees and an angular resolution of 0.09 degrees (e.g., 360 degrees/0.09 degrees angular resolution=4000 yaw values).

The value of each pixel in each image channel 255 represents either the range value or intensity value of the sensor orientation data 250. In various embodiments, the representation generation module 215 expresses the range value and intensity value in bits. In various embodiments, the representation generation module 215 expresses the range value using 2 bytes (16 bits) and the intensity value in 1 byte (8 bits). The number of bytes used to express each of the range value and the intensity value is dependent on a step value which can be further dependent on a specification of the sensor 105 of the vehicle 150. For example, if the maximum LiDAR range of the vehicle sensor 105 is 120 meters, a step value of 0.2 cm per value (e.g., '00' represents 0 cm, '01' represents 0.2 cm, '10' represents 0.4 cm, and the like) can be set which enables expression of range values up to 128 meters using 16 bits. If a higher resolution is desired (e.g., higher resolution beyond 0.2 cm per value), the number of bits used to express the range value can be increased accordingly. As another example, the LiDAR vehicle sensor 105 may output an intensity value in the set of [0, 1]. Therefore, using a step value of 1/256, the intensity value can be expressed using 8 bits.

Referring to the first image channel 255A, the pixel value of the first image channel 255A is a first range byte 270 that corresponds to a value of pitch 260 (y-axis) and yaw 265 (x-axis). Here, the first range byte 270 can be the most significant byte (e.g., first 8 bits) of the range value. Referring to the second image channel 255B, the pixel value of the second image channel 255B is a second range byte 275 that corresponds to a value of pitch 260 (y-axis) and yaw 265 (x-axis). Here, the second range byte 275 can be the least significant byte (e.g., last 8 bits) of the range value. Referring to the third image channel, the pixel value of the third image channel 255C is an intensity byte 280 that corresponds to a value of pitch 260 (y-axis) and yaw 265 (x-axis).

Although FIG. 2B depicts three image channels 255, in various embodiments, the representation generation module 215 can generate more than three image representations. For example, more than two image channels 255 (e.g., image channel 255A and image channel 255B) can be generated to express additional bytes of range values if additional resolution is desired. As another example, the representation generation module 215 can generate a fourth image representation where each pixel of the fourth image representation represents a color, such as an red, green, blue (RGB) color, at the location in the environment corresponding to the value of pitch 260 (y-axis) and yaw 265 (x-axis).

In various embodiments, the representation generation module 215 modifies the generated image channels 255 to improve their subsequent compression. For example, in many image channels 255, there may be holes where a pixel does not possess a value. Holes in an image channel 255 can arise when the sensor 105 does not detect a return signal at a particular pitch 260 and yaw 265 value. As these holes in an image channel 255 can prove problematic during compression, the representation generation module 215 modifies the image representation to address the holes. In one embodiment, the representation generation module 215 copies a pixel value from an adjacent pixel to fill the hole. In various embodiments, the representation generation module 215 either right or left shifts pixels in each row to fill the hole. In other embodiments, the representation generation module 215 removes pixels that do not have values. Here, by removing pixels, the representation generation module 215 can reduce the rows and/or columns of an image channel 255. Therefore, a modified image channel 255 can achieve a higher compression ratio once compressed. In various embodiments, the representation generation module 215 further generates a bitmap that indicates the presence or absence of pixel values. For example, pixels that included a value can be coded as '1' whereas pixels without a value (e.g., holes) are coded as '0.' Thus, the bitmap can be used to understand which pixels were removed.

As another example, the representation generation module 215 can crop image channels 255 to eliminate pixels that do not contain any information. In one embodiment, the representation generation module 215 crops image channels based on the specifications of the sensor 105 of the vehicle 150. For example, if the color camera sensors 105 of the vehicle 150 possess a 120 degree field of view, then only a third of the pixels in an image channel 255 includes color information. Therefore, the representation generation module 215 crops the pixels of the image channel that do not contain color values.

The representation generation module 215 provides each of the image channels 255 to the representation compression module 220 to generate codes 285 for each image channel 255. The representation compression module 220 can perform either a lossless compression or a lossy compression on each image channel 255. Here, image channels 255 that possess important information that is less tolerable to error undergo a lossless compression whereas image channels 255 that include information that is more tolerable to error undergo a lossy compression.

Specifically, referring to FIG. 2B, the representation compression module 220 performs a lossless compression on the first image channel 255A that includes pixel values that represent the first range byte 270 (e.g., most significant byte) of the range value. Here, an error in the first range byte 270 that arises due to compression can significantly impact the precision of the reconstructed HD map and as such, the first image channel 255A undergoes lossless compression. In various embodiments, the representation compression module 220 performs a lossy compression on the second image channel 255B. Here, an error in the second range byte 275 that arises due to compression can be tolerable as it does not significantly impact the precision of the reconstructed HD map. Thus, the second image channel 255B undergoes lossy compression. The third image channel 255C that includes pixel values that represent the intensity byte 280 can undergo either lossless or lossy compression. In one embodiment, the representation compression module 220 determines a loss representing a difference between a reconstructed version of the third image channel 255C that had undergone lossy compression. If the determined loss exceeds a threshold value, the representation compression module 220 can choose to perform a lossless compression on the third image channel 255C to ensure that the subsequently reconstructed version is sufficiently accurate for building the HD map.

In various embodiments, the representation compression module 220 performs a combination of lossless and lossy compression on the image channels 255 using a WebP compression. In some embodiments, the representation compression module 220 independently compresses each of the image channels 255 by individually applying a compression algorithm to each image channel 255. Following compression, the representation compression module 220 obtains the codes 285 corresponding to each image channel 255.

The representation compression module 220 may package the codes 285 to generate the packaged compressed codes 225. In various embodiments, the packaged compressed codes 225 further includes compressed codes for the bitmap that indicates the presence or absence of pixel values in an image channel 255. Therefore, the bitmap can be used by the online HD map system 110 to understand which pixels were removed during encoding. In various embodiments, the representation compression module 220 can include additional metadata of the point cloud. Examples of additional metadata include color information, a semantic label (e.g., ground, tree, and the like), and other information that is useful for map building and localization. In various embodiments, the representation compression module 220 applies a protocol buffer to package the codes 285 to generate the packaged compressed codes 225.

The vehicle computing system 120 transmits the packaged compressed codes 225 to the online HD map system 110 such that the online HD map system 110 can decode the packaged compressed codes 225 and generate the HD map with high precision.

Figure 2C:
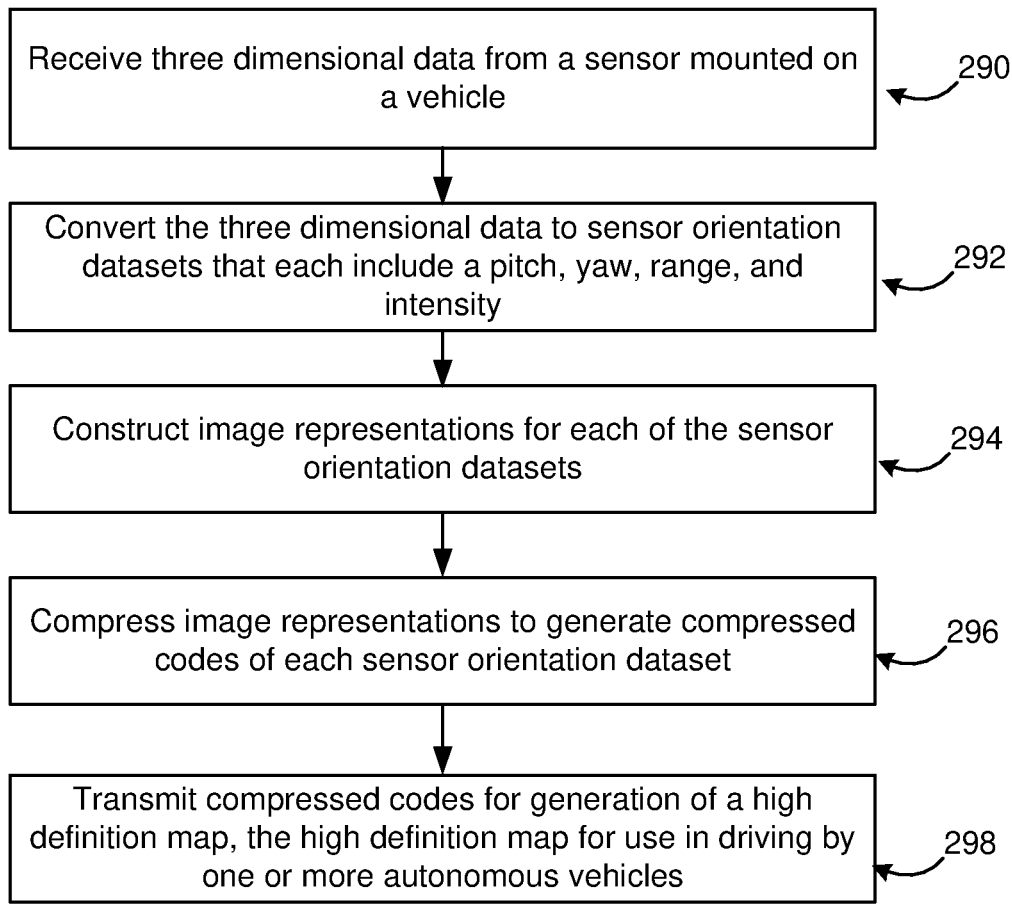
FIG. 2C is a flow diagram for encoding and transmitting compressed codes representing three dimensional data captured by a vehicle for generation of a high definition map, according to an embodiment.

FIG. 2C is a flow diagram for encoding and transmitting compressed codes 225 representing three dimensional data captured by a vehicle 150 for generation of a high definition map, according to an embodiment. The vehicle computing system 120 receives 290 three dimensional data from a vehicle sensor 105 mounted on the vehicle 150. The vehicle computing system 120 converts 292 the three dimensional data to sensor orientation datasets. For example, the three dimensional data may be represented as (x, y, z, intensity) whereas the sensor orientation datasets may be represented as (pitch, yaw, range, intensity). Using the sensor orientation datasets, the vehicle computing system 120 constructs 294 image representations. Here, each image representation includes pixels that represent a combination of a pitch and yaw value. Each pixel value represents a byte of either a range value or an intensity value. The vehicle computing system 120 compresses 296 image representations to generate compressed codes for each sensor orientation dataset. In various embodiments, the vehicle computing system 120 performs a lossless compression on at least one image representation and also performs a lossy compression on at least one image representation. The vehicle computing system 120 transmits 296 the compressed codes to the online HD map system 110. The compressed codes can be used to generate the high definition map, which can further be provided to an autonomous vehicle to guide the driving of the autonomous vehicle.

Vehicle Operation Using HD Map

Figure 3:
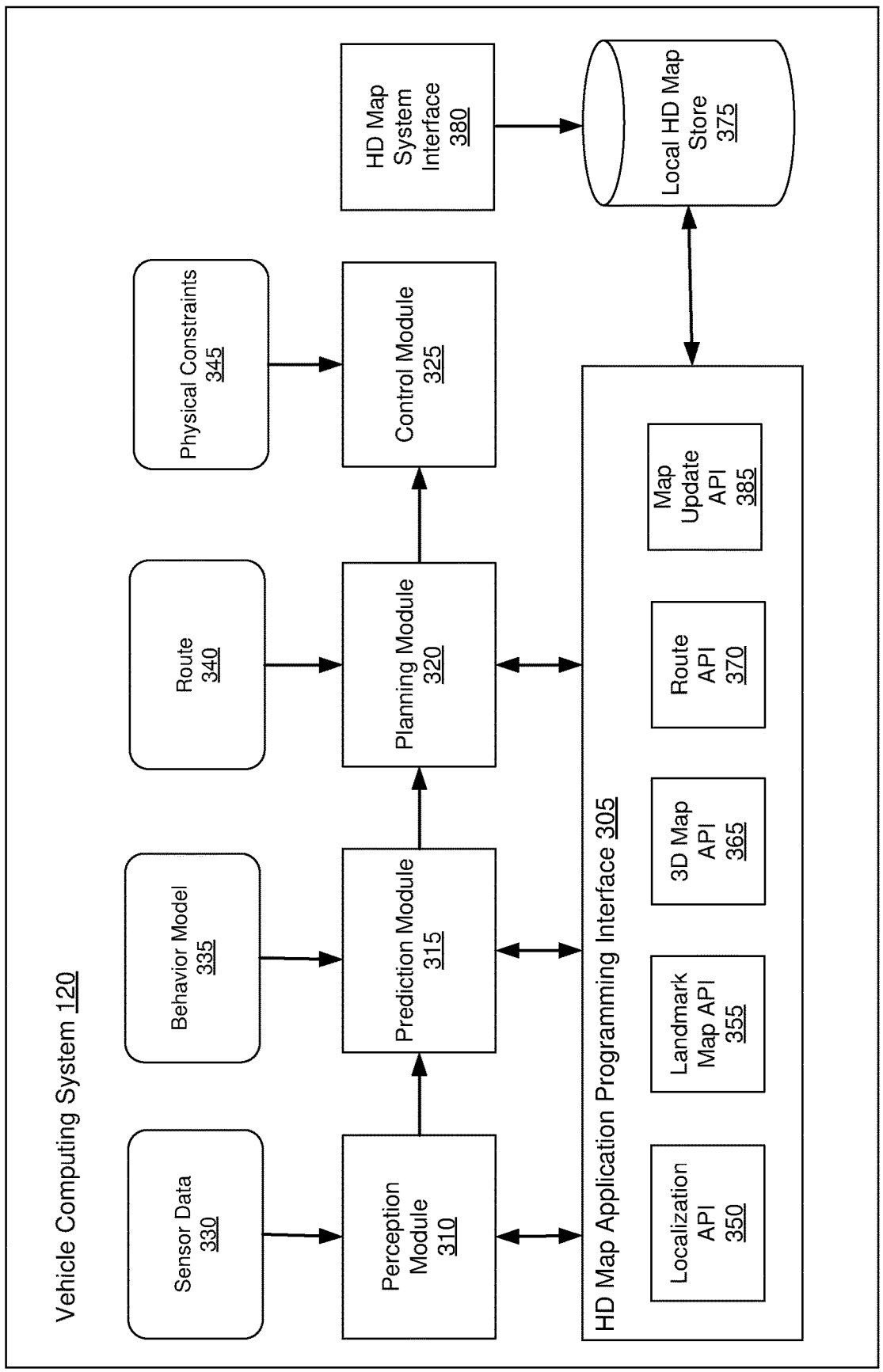
FIG. 3 depicts a block diagram flow process for controlling a vehicle using a HD map, according to an embodiment.

FIG. 3 depicts a block diagram flow process for controlling a vehicle 150 using a HD map, according to an embodiment. Generally, the block diagram flow process shown in FIG. 3 occurs after the online HD map system 110 generates the HD map, as is described below in relation to FIGS. 5-9. Thus, as a vehicle 150 is driving within a geographical region, a portion of the HD map that corresponds to the geographical region is provided to the vehicle 150 to control the vehicle 150.

As shown in FIG. 3, the vehicle computing system 120 comprises a perception module 310, prediction module 315, planning module 320, a control module 325, a local HD map store 375, an HD map system interface 380, and an HD map application programming interface (API) 305. The various modules of the vehicle computing system 120 process various type of data including sensor data 330, a behavior model 335, routes 340, and physical constraints 345. In other embodiments, the vehicle computing system 120 may have more or fewer modules. Functionality described as being implemented by a particular module may be implemented by other modules.

The perception module 310 receives sensor data 330 from the sensors 105 of the vehicle 150. This includes data collected by cameras of the vehicle 150, LIDAR, IMU, GPS navigation system, and so on. The perception module 310 uses the sensor data to determine what objects are around the vehicle 150, the details of the road on which the vehicle 150 is travelling, and so on. The perception module 310 processes the sensor data 330 to populate data structures storing the sensor data and provides the information to the prediction module 315.

The prediction module 315 interprets the data provided by the perception module using behavior models of the objects perceived to determine whether an object is moving or likely to move. For example, the prediction module 315 may determine that entities representing road signs are not likely to move, whereas entities identified as vehicles, people, and so on, are either moving or likely to move. The prediction module 315 uses the behavior models 335 of various types of objects to determine whether they are likely to move. The prediction module 315 provides the predictions of various objects to the planning module 320 to plan the subsequent actions that the vehicle needs to take next.

The planning module 320 receives the information describing the surroundings of the vehicle from the prediction module 315, the route 340 that determines the destination of the vehicle, and the path that the vehicle 150 should take to get to the destination. The planning module 320 uses the information from the prediction module 315 and the route 340 to plan a sequence of actions that the vehicle needs to take within a short time interval, for example, within the next few seconds. In an embodiment, the planning module 320 specifies the sequence of actions as one or more points representing nearby locations that the vehicle needs to drive through next. The planning module 320 provides the details of the plan comprising the sequence of actions to be taken by the vehicle to the control module 325. The plan may determine the subsequent action of the vehicle 150, for example, whether the vehicle 150 performs a lane change, a turn, acceleration by increasing the speed or slowing down, and so on.

The control module 325 determines the control signals for sending to the controls 130 of the vehicle based on the plan received from the planning module 320. For example, if the vehicle is currently at point A and the plan specifies that the vehicle should next go to a nearby point B, the control module 325 determines the control signals for the controls 130 that would cause the vehicle to go from point A to point B in a safe and smooth way, for example, without taking any sharp turns or a zig zag path from point A to point B. The path taken by the vehicle to go from point A to point B may depend on the current speed and direction of the vehicle as well as the location of point B with respect to point A. For example, if the current speed of the vehicle is high, the vehicle may take a wider turn compared to a vehicle driving slowly.

The control module 325 also receives physical constraints 345 as input. These include the physical capabilities of that specific vehicle. For example, a car having a particular make and model may be able to safely make certain types of vehicle movements such as acceleration, and turns that another car with a different make and model may not be able to make safely. The control module 325 incorporates these physical constraints in determining the control signals. The control module 325 sends the control signals to the vehicle controls 130 that cause the vehicle to execute the specified sequence of actions causing the vehicle to move as planned. The above steps are constantly repeated every few seconds causing the vehicle to drive safely along the route that was planned for the vehicle.

The various modules of the vehicle computing system 120 including the perception module 310, prediction module 315, and planning module 320 receive map information to perform their respective computation. The vehicle 150 stores the HD map data in the local HD map store 375. The modules of the vehicle computing system 120 interact with the map data using the HD map API 305 that provides a set of application programming interfaces (APIs) that can be invoked by a module for accessing the map information.

The HD map system interface 380 allows the vehicle computing system 120 to interact with the online HD map system 110 via a network (not shown in the Figures). As an example, the HD map system interface 380 receives compressed map data, which can be a geographical region of the HD map that the vehicle 150 is traveling towards, from the online HD map system 110. The HD map system interface 380 can process the compressed map data and locally store the map data in the local HD map store 375. The local HD map store 375 stores map data in a format specified by the HD Map system 110.

In various embodiments, the compressed map data received by the HD map system interface 380 includes encoded bits of multiple entities within a geographical region of the HD map. Generation and encoding of bits that represent multiple entities of a geographical region by the online HD map system 110 is described in further detail below in relation to FIGS. 9A and 9B. Here, the HD map system interface 380 decompresses the compressed map data to obtain positional data of entities within the geographical region of the HD map. The HD map system interface 380 can store the positional data of entities of the geographical region of the HD map in the local HD map store 375.

In some embodiments, the HD map system interface 380 performs further processing steps on the map data. In various embodiments, positional data of entities in the map data can be expressed in relation to a reference centerline of the geographical region. The HD map system interface 380 can convert the positional data of each entity that is in relation to the reference centerline to a global coordinate, such as longitude and latitude coordinates. Thus, the HD map system interface 380 stores the global coordinates of each entity in the geographical region of the HD map in the local HD map store 375. As used hereafter, an entity in the HD map includes, but is not limited to, any one of a lane line, a lane element, a navigable surface boundary (e.g., a lane boundary), a stop or yield line, a zone (e.g., a cross walk or "keep clear" region), a traffic light, or a road sign.

The HD map API 305 is capable of processing the map data format as provided by the HD Map system 110. The HD Map API 305 provides the vehicle computing system 120 with an interface for interacting with the HD map data. The HD map API 305 includes several APIs including the localization API 350, the landmark map API 355, the 3D map API 365, the route API 370$^{th}$, the map update API 385, and so on.

The localization APIs 350 determine the current location of the vehicle 150, for example, when the vehicle 150 starts and as the vehicle 150 moves along a route. The localization APIs 350 include a localize API that determines an accurate location of the vehicle 150 within the HD Map. The vehicle computing system 120 can use the location as an accurate relative positioning for making other queries, for example, feature queries, navigable space queries, and occupancy map queries further described herein. The localize API receives inputs comprising one or more of, location provided by GPS, vehicle motion data provided by IMU, LIDAR scanner data, and camera images. The localize API returns an accurate location of the vehicle as latitude and longitude coordinates. The coordinates returned by the localize API are more accurate compared to the GPS coordinates used as input, for example, the output of the localize API may have precision range from 1-10 cm. In one embodiment, the vehicle computing system 120 invokes the localize API to determine location of the vehicle 150 periodically based on the LIDAR using scanner data, for example, at a frequency of 10 Hz. The vehicle computing system 120 may invoke the localize API to determine the vehicle location at a higher rate (e.g., 60 Hz) if GPS/IMU data is available at that rate. The vehicle computing system 120 stores as internal state, location history records to improve accuracy of subsequent localize calls. The location history record stores history of location from the point-in-time, when the car was turned off/stopped. The localization APIs 350 include a localize-route API generates an accurate route specifying lanes based on the HD map. The localize-route API takes as input a route from a source to destination via a third party maps and generates a high precision routes represented as a connected graph of navigable lanes along the input routes based on HD maps.

The landmark map API 355 provides the geometric and semantic description of the world around the vehicle, for example, description of various portions of lanes that the vehicle is currently travelling on. The landmark map APIs 355 comprise APIs that allow queries based on landmark maps, for example, fetch-lanes API and fetch-features API. The fetch-lanes API provide lane information relative to the vehicle and the fetch-features API. The fetch-lanes API receives as input a location, for example, the location of the vehicle specified using latitude and longitude of the vehicle and returns lane information relative to the input location. The fetch-lanes API may specify a distance parameters indicating the distance relative to the input location for which the lane information is retrieved. The fetch-features API receives information identifying one or more lane elements and returns landmark features relative to the specified lane elements. The landmark features include, for each landmark, a spatial description that is specific to the type of landmark.

The 3D map API 365 provides efficient access to the spatial 3-dimensional (3D) representation of the road and various physical objects around the road as stored in the local HD map store 375. The 3D map APIs 365 include a fetch-navigable-surfaces API and a fetch-occupancy-grid API. The fetch-navigable-surfaces API receives as input, identifiers for one or more lane elements and returns navigable boundaries for the specified lane elements. The fetch-occupancy-grid API receives a location as input, for example, a latitude and longitude of the vehicle, and returns information describing occupancy for the surface of the road and all objects available in the HD map near the location. The information describing occupancy includes a hierarchical volumetric grid of all positions considered occupied in the map. The occupancy grid includes information at a high resolution near the navigable areas, for example, at curbs and bumps, and relatively low resolution in less significant areas, for example, trees and walls beyond a curb. The fetch-occupancy-grid API is useful for detecting obstacles and for changing direction if necessary.

The 3D map APIs also include map update APIs, for example, download-map-updates API and upload-map-updates API. The download-map-updates API receives as input a planned route identifier and downloads map updates for data relevant to all planned routes or for a specific planned route. The upload-map-updates API uploads data collected by the vehicle computing system 120 to the online HD map system 110. This allows the online HD map system 110 to keep the HD map data stored in the online HD map system 110 up to date based on changes in map data observed by sensors of vehicles driving along various routes.

The route API 370 returns route information including full route between a source and destination and portions of route as the vehicle travels along the route. The route APIs 370 include add-planned-routes API and get-planned-route API. The add-planned-routes API provides information describing planned routes to the online HD map system 110 so that information describing relevant HD maps can be downloaded by the vehicle computing system 120 and kept up to date. The add-planned-routes API receives as input, a route specified using polylines expressed in terms of latitudes and longitudes and also a time-to-live (TTL) parameter specifying a time period after which the route data can be deleted. Accordingly, the add-planned-routes API allows the vehicle to indicate the route the vehicle is planning on taking in the near future as an autonomous trip. The add-planned-route API aligns the route to the HD map, records the route and its TTL value, and makes sure that the HD map data for the route stored in the vehicle computing system 120 is up to date. The get-planned-routes API returns a list of planned routes and provides information describing a route identified by a route identifier.

The map update API 385 manages operations related to updating of map data, both for the local HD map store 375 and for the HD map store 165 stored in the online HD map system 110. Accordingly, modules in the vehicle computing system 120 invoke the map update API 385 for downloading data from the online HD map system 110 to the vehicle computing system 120 for storing in the local HD map store 375 as necessary. The map update API 385 also allows the vehicle computing system 120 to determine whether the information monitored by the vehicle sensors 105 indicates a discrepancy in the map information provided by the online HD map system 110 and uploads data to the online HD map system 110 that may result in the online HD map system 110 updating the map data stored in the HD map store 165 that is provided to other vehicles 150.

Figure 4:
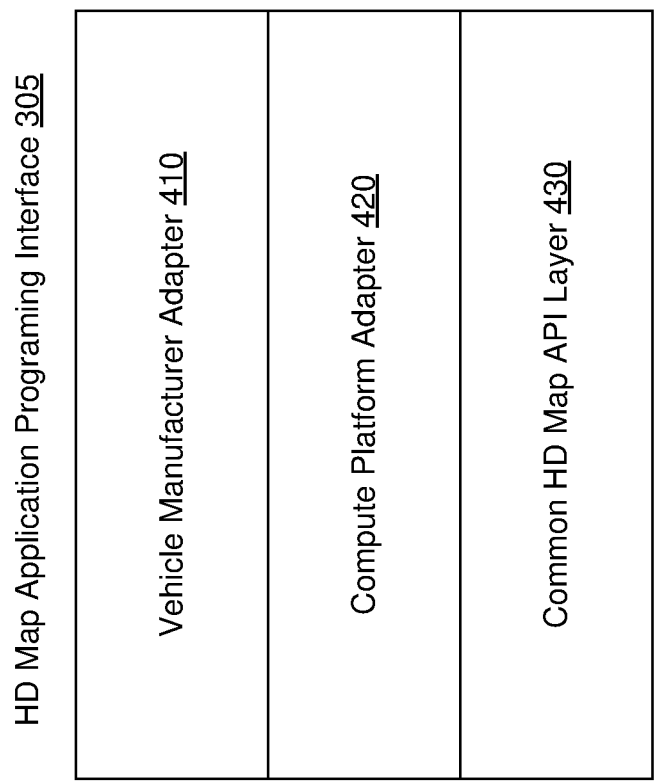
FIG. 4 illustrates the various layers of instructions in the HD Map API of a vehicle computing system, according to an embodiment.

FIG. 4 illustrates the various layers of instructions in the HD Map API of a vehicle computing system, according to an embodiment. Different manufacturer of vehicles have different instructions for receiving information from vehicle sensors 105 and for controlling the vehicle controls 130. Furthermore, different vendors provide different compute platforms with autonomous driving capabilities, for example, collection and analysis of vehicle sensor data. Examples of compute platform for autonomous vehicles include platforms provided vendors, such as NVIDIA, QUALCOMM, and INTEL. These platforms provide functionality for use by autonomous vehicle manufacturers in manufacture of autonomous vehicles. A vehicle manufacturer can use any one or several compute platforms for autonomous vehicles. The online HD map system 110 provides a library for processing HD maps based on instructions specific to the manufacturer of the vehicle and instructions specific to a vendor specific platform of the vehicle. The library provides access to the HD map data and allows the vehicle to interact with the online HD map system 110.

As shown in FIG. 4, in an embodiment, the HD map API is implemented as a library that includes a vehicle manufacturer adapter 410, a compute platform adapter 420, and a common HD map API layer 430. The common HD map API layer 430 comprises generic instructions that can be used across a plurality of vehicle compute platforms and vehicle manufacturers. The compute platform adapter 420 include instructions that are specific to each computer platform. For example, the common HD Map API layer 430 may invoke the compute platform adapter 420 to receive data from sensors supported by a specific compute platform. The vehicle manufacturer adapter 410 comprises instructions specific to a vehicle manufacturer. For example, the common HD map API layer 430 may invoke functionality provided by the vehicle manufacturer adapter 410 to send specific control instructions to the vehicle controls 130.

The online HD map system 110 stores compute platform adapters 420 for a plurality of compute platforms and vehicle manufacturer adapters 410 for a plurality of vehicle manufacturers. The online HD map system 110 determines the particular vehicle manufacturer and the particular compute platform for a specific autonomous vehicle. The online HD map system 110 selects the vehicle manufacturer adapter 410 for the particular vehicle manufacturer and the compute platform adapter 420 for the particular compute platform of that specific vehicle. The online HD map system 110 sends instructions of the selected vehicle manufacturer adapter 410 and the selected compute platform adapter 420 to the vehicle computing system 120 of that specific autonomous vehicle. The vehicle computing system 120 of that specific autonomous vehicle installs the received vehicle manufacturer adapter 410 and the compute platform adapter 420. The vehicle computing system 120 periodically checks if the online HD map system 110 has an update to the installed vehicle manufacturer adapter 410 and the compute platform adapter 420. If a more recent update is available compared to the version installed on the vehicle, the vehicle computing system 120 requests and receives the latest update and installs it.

Online HD Map System

HD Map System Architecture

FIG. 5 shows the system architecture of an HD map system, according to an embodiment. The online HD map system 110 comprises a data decoding module 505, a positional data processing module 510, a map creation module 515, a map update module 520, a map data encoding module 530, a load balancing module 540, a map accuracy management module 550, a vehicle interface module, and a HD map store 165. Other embodiments of online HD map system 110 may include more or fewer modules than shown in FIG. 5. Functionality indicated as being performed by a particular module may be implemented by other modules. In an embodiment, the online HD map system 110 may be a distributed system comprising a plurality of processors.

The data decoding module 505 receives the packaged compressed codes 225 (see FIG. 2B) generated and transmitted from the vehicle 150. Generally, the data decoding module 505 performs the inverse operation performed by the representation compression module 220 described above. The data decoding module 505 decodes the packaged compressed codes 225 to regenerate the image representations, such as image channels 255 shown in FIG. 2B. Such image representations can be image channels 255 described above in reference to FIG. 2B. For example, each pixel in an image channel 255 can represent a particular orientation, as defined by a pitch 260 and a yaw 265 value and possess a pixel value, which is one of the first range byte 270, second range byte 275, or intensity byte 280.

In various embodiments, the data decoding module 505 uses a bitmap included as a part of the packaged compressed codes 225 to regenerate the image representations. As described above, the bitmap may indicate holes in the image representation that were previously removed or filled in. Therefore, the data decoding module 505 can recreate the holes in the image representations given the bitmap.

Given the regenerated image representations, the data decoding module 505 extracts the pixel values from the image representations to obtain the variables (pitch, yaw, range, intensity). For example, the data decoding module 505 combines the first range byte 270 and the second range byte 275 to obtain the range value. The data decoding module 505 provides the pixel values to the positional data processing module 510.

The positional data processing module 510 converts the variables (pitch, yaw, range, intensity) to the variables (x, y, z, intensity). The positional data processing module 510 can perform the conversion using the relational equations (e.g., Equation 3, Equation 4, and Equation 5) described above. The positional processing module provides the three dimensional positional variables (x, y, z) and the intensity variable for each position to the map creation module 515 to generate the HD map.

The map creation module 515 creates the map using the three dimensional position data (e.g., x, y, z) and intensity data collected from vehicles that are driving along various routes. The map update module 520 updates previously computed map data by receiving more recent information from vehicles that recently travelled along routes on which map information changed. For example, if certain road signs have changed or lane information has changed as a result of construction in a region, the map update module 520 updates the maps accordingly. The map data encoding module 530 encodes map data to be able to store the data efficiently as well as send the required map data to vehicles 150 efficiently. The methods performed by the map data encoding module 530 for encoding entities within a geographical region of an HD map is described below in relation to FIGS. 7A-7B.

The load balancing module 540 balances load across vehicles to ensure that requests to receive data from vehicles are uniformly distributed across different vehicles. The map accuracy management module 550 maintains high accuracy of the map data using various techniques even though the information received from individual vehicles may not have high accuracy.

The HD map store 165 holds HD maps that are created by the map creation module 515, updated by the map update module 520, and maintained by the map accuracy management module 550. In various embodiments, the HD map is partitioned into various geographical regions. The HD map of a geographical region comprises a landmark map and an occupancy map. The landmark map comprises information describing lanes including spatial location of lanes and semantic information about each lane. The spatial location of a lane comprises the geometric location in latitude, longitude and elevation at high precision, for example, at or below 10 cm precision. The semantic information of a lane can include driving restrictions such as a driving direction, a speed limit, type of lane (for example, a lane for going straight, a left turn lane, a right turn lane, an exit lane, and the like), a restriction on crossing in a direction (e.g., to the left or to the right), restriction on a connectivity to other lanes, a weight limit on the road, a time during which a driving restriction is to be enforced, and so on. The landmark map may further comprise information describing stop lines, yield lines, spatial location of cross walks, safely navigable space, spatial location of speed bumps, curb, and road signs comprising spatial location and type of all signage that is relevant to driving restrictions. Examples of road signs described in an HD map include stop signs, traffic lights, speed limits, one-way, do-not-enter, yield (vehicle, pedestrian, animal), and so on.

The occupancy map includes spatial 3-dimensional (3D) representation of the road and all physical objects around the road. The data stored in an occupancy map is also referred to herein as occupancy grid data. The 3D representation may be associated with a confidence score indicative of a likelihood of the object existing at the location. The occupancy map may be represented in a number of other ways. In one embodiment, the occupancy map is represented as a 3D mesh geometry (collection of triangles) which covers the surfaces. In another embodiment, the occupancy map is represented as a collection of 3D points which cover the surfaces. In another embodiment, the occupancy map is represented using a 3D volumetric grid of cells at 5-10 cm resolution. Each cell indicates whether or not a surface exists at that cell, and if the surface exists, a direction along which the surface is oriented.

The occupancy map may require a large amount of storage space compared to a landmark map. For example, data of 1 GB/Mile may be used by an occupancy map, resulting in the map of the United States (including 4 million miles of road) occupying $4 \times 10^{15}$ bytes or 4 petabytes. Therefore the online HD map system 110 and the vehicle computing system 120 use data compression techniques for being able to store and transfer map data thereby reducing storage and transmission costs. Accordingly, the techniques disclosed herein make self-driving of autonomous vehicles possible.

In one embodiment, the HD map does not require or rely on data typically included in maps, such as addresses, road names, ability to geo-code an address, and ability to compute routes between place names or addresses. The vehicle computing system 120 or the online HD map system 110 accesses other map systems, for example, GOOGLE MAPs to obtain this information. Accordingly, a vehicle computing system 120 or the online HD map system 110 receives navigation instructions from a tool such as GOOGLE MAPs into a route and converts the information to a route based on the HD map information.

Geographical Regions in HD Maps

The map creation module 515 of the HD map system 110 divides a large physical area into geographical regions and stores a representation of each geographical region. Each geographical region represents a contiguous area bounded by a geometric shape, for example, a rectangle or square. In an embodiment, the map creation module 515 divides a physical area into geographical regions of the same size independent of the amount of data required to store the representation of each geographical region. In another embodiment, the map creation module 515 divides a physical area into geographical regions of different sizes, where the size of each geographical region is determined based on the amount of information needed for representing the geographical region. For example, a geographical region representing a densely populated area with a large number of streets represents a smaller physical area compared to a geographical region representing sparsely populated area with very few streets. Accordingly, in this embodiment, the map creation module 515 determines the size of a geographical region based on an estimate of an amount of information required to store the various elements of the physical area relevant for an HD map.

In an embodiment, the map creation module 515 represents a geographic region using an object or a data record that comprises various attributes including, a unique identifier for the geographical region, a unique name for the geographical region, description of the boundary of the geographical region, for example, using a bounding box of latitude and longitude coordinates, and a collection of landmark features and occupancy grid data.

Figure 6A:
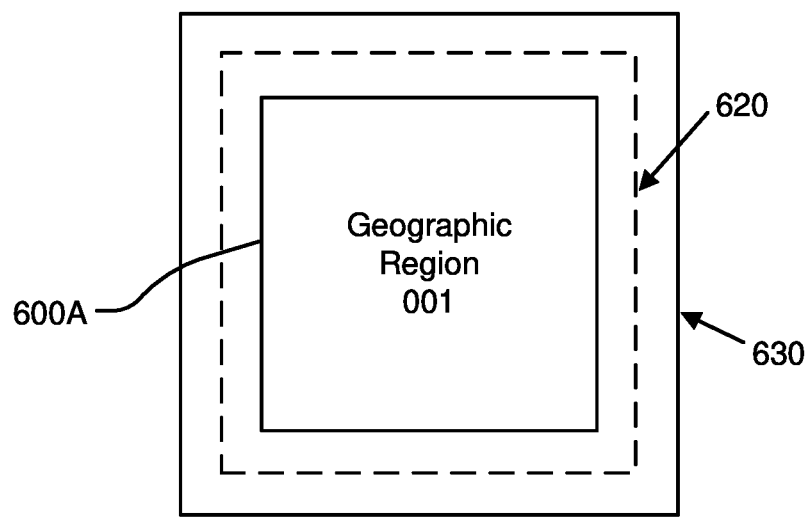
FIG. 6A illustrates a geographical region defined in an HD map, according to an embodiment.
Figure 6B:
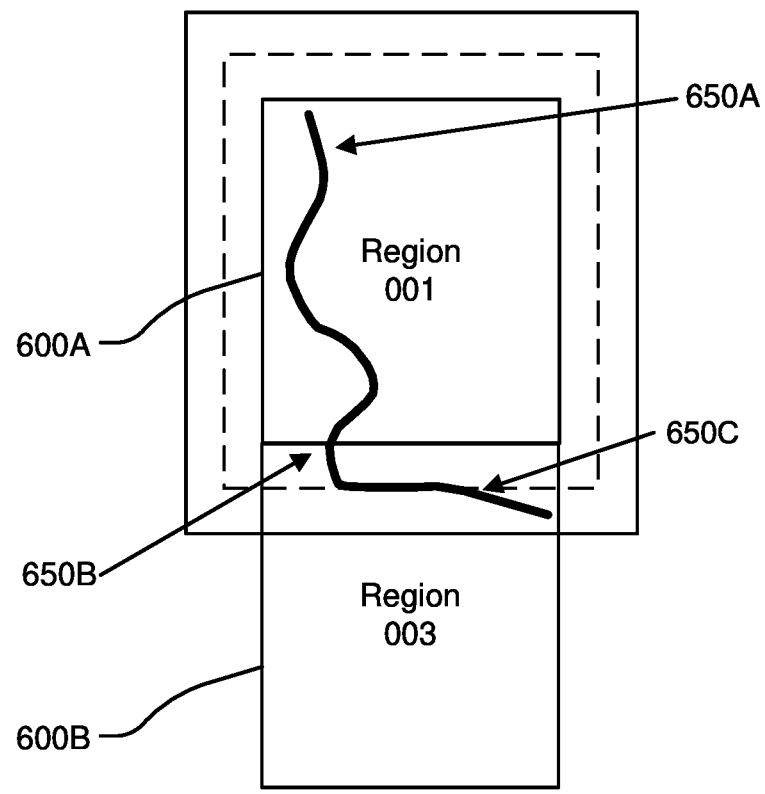
FIG. 6B illustrates an example path taken by a vehicle through a geographical region, according to an embodiment.

FIG. 6A illustrates a geographical region 600A defined in an HD map, according to an embodiment. In some embodiments, a geographical region 600A is square shaped though in other embodiments, the geographical region is differently shaped. Generally, an HD map can include one or more geographical regions 600 that are adjacent to one another. For example, FIG. 6B depicts a geographical region 600B (e.g., region 003) that is adjacent to geographical region 600A. Therefore, as a vehicle 150 is traveling, the vehicle 150 may travel across geographical region boundaries to enter into one or more different geographical regions of the HD map.

According to an embodiment, as illustrated in FIG. 6A, each geographic region has a buffer of a predetermined width around it. The buffer comprises redundant map data around all 4 sides of a geographic region (in the case that the geographic region is bounded by a rectangle). FIG. 6A shows a boundary 620 for a buffer of 50 meters around the geographic region 600A and a boundary 630 for buffer of 100 meters around the geographic region 600A. Including buffer zones around geographic regions is beneficial when an HD map is used by a vehicle 150. For example, the vehicle computing system 120 switches the current geographical region of a vehicle from one geographical region to the neighboring geographical region when the vehicle crosses a threshold distance within this buffer. As shown in FIG. 6B, a vehicle starts at location 650A in the geographical region 600A. The vehicle traverses along a route to reach a location 650B where it cross the boundary of the geographical region 610 but stays within the boundary 620 of the buffer. Accordingly, the vehicle computing system 120 continues to use the geographical region 610A as the current geographical region of the vehicle. Once the vehicle crosses the boundary 620 of the buffer at location 650C, the vehicle computing system 120 switches the current geographical region of the vehicle to geographical region 600B from 600A. The use of a buffer prevents rapid switching of the current geographical region of a vehicle as a result of the vehicle travelling along a route that closely tracks a boundary of a geographical region.

Representation of Information in HD Maps

The map creation module 515 represents information of roads within HD maps. Although the embodiments described herein refer to roads, the techniques are applicable to streets, highways, alleys, avenues, boulevards, or any other path on which vehicles can travel. The map creation module 515 uses lanes of roads as a reference frame for purposes of routing and for localization of a vehicle. The lanes represented within an HD map include lanes that are explicitly marked, for example, white and yellow striped lanes, lanes that are implicit, for example, on a country road with no lines or curbs but two directions of travel, and implicit paths that act as lanes, for example, the path that a turning car makes when entering a lane from another lane.

The map creation module 515 also generates an HD map that includes information relative to lanes, for example, entities within a geographical region that are of importance to a vehicle 150 driving in the lane. For example, such entities include road signs and traffic lights relative to the lanes, occupancy grids relative to the lanes for obstacle detection, and navigable spaces relative to the lanes so the vehicle 150 can efficiently plan/react in emergencies when the vehicle must make an unplanned move out of the lane. Accordingly, the HD map can be a network of lanes that enables a vehicle 150 to plan a legal path between a source and a destination and to add a frame of reference for real time sensing and control of the vehicle 150.

Figure 7:
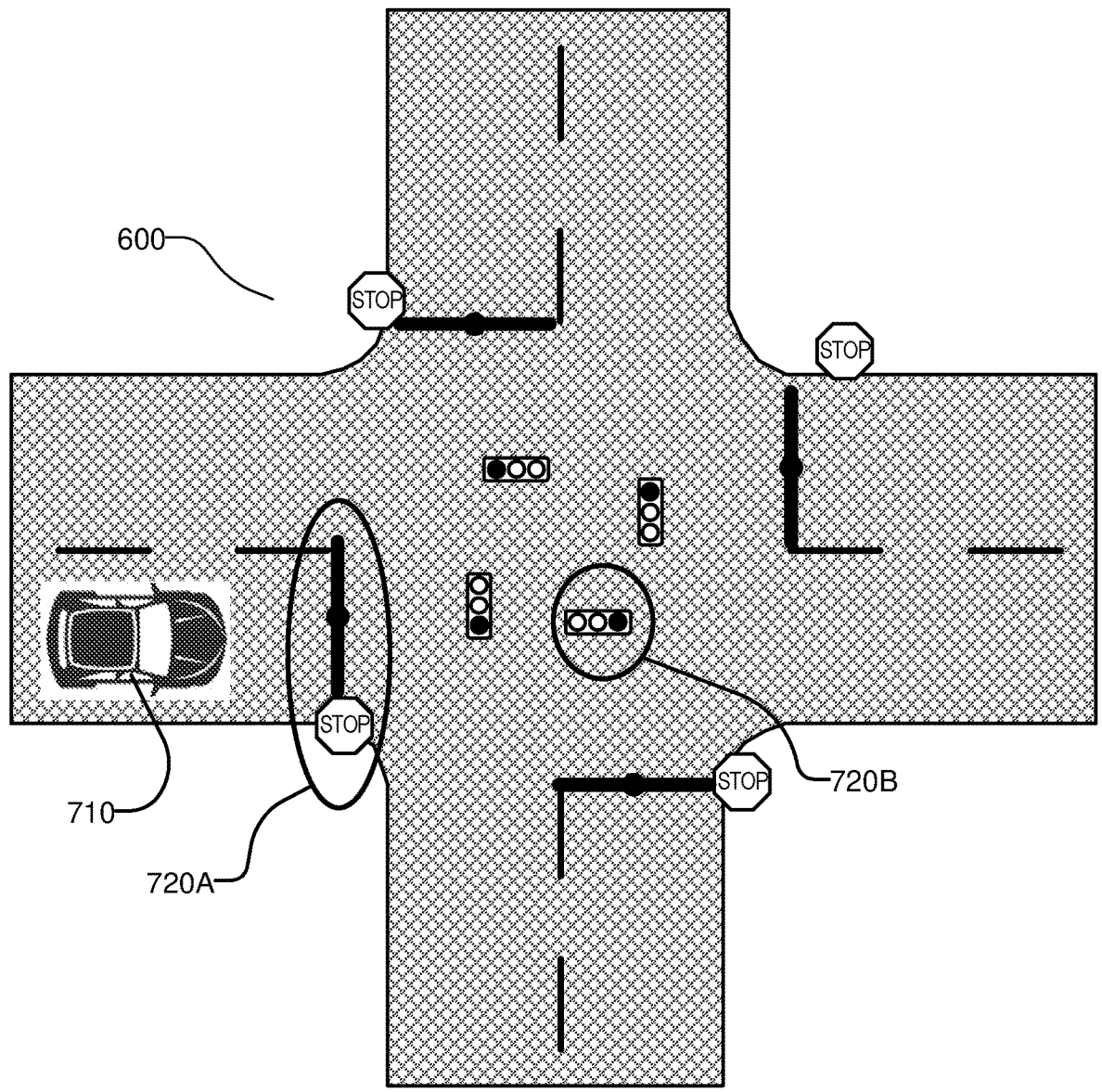
FIG. 7 illustrates entities, such as road signs and lanes, in an HD map, according to an embodiment.

FIG. 7 illustrates lane representations in an HD map, according to an embodiment. In one embodiment, the region depicted in FIG. 8 is a geographical region 600 of an HD map. Here, the geographical region 600 includes a traffic intersection. The online HD map system 110 provides the vehicle 150 with access to the map data that is relevant for autonomous driving of the vehicle in the geographical region 600. The geographical region 600 of the HD map provided to the vehicle includes, for example, entities 720A and 720B that are of importance to the vehicle 710. Here, the entities 720A and 720B may not be the closest entities to the vehicle 710 but nonetheless, are relevant for the vehicle based on the lane that the vehicle is currently in. Therefore, the online HD map system 110 stores a lane-centric representation of data that represents the relationship of the lane to the entity so that the vehicle can efficiently extract the entity given a lane that the vehicle is driving within.

The HD map represents portions of the lanes as lane elements. A lane element specifies the boundaries of the lane and various constraints including the legal direction in which a vehicle can travel within the lane element, the speed with which the vehicle can drive within the lane element, whether the lane element is for left turn only, or right turn only, and so on. The HD map system 110 represents a lane element as a continuous geometric portion of a single lane. The HD map includes objects or data structures representing lane elements that comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road entities that are relevant for autonomous driving, for example, traffic light locations, road sign locations and so on.

Examples of lane elements represented by the HD map include, a piece of a right lane on a freeway, a piece of a lane on a road, a left turn lane, the turn from a left turn lane into another lane, a merge lane from an on-ramp an exit lane on an off-ramp, and a driveway. The HD map represents a one lane road using two lane elements, one for each direction. The HD map represents median turn lanes that are shared similar to a one-lane road.

Figure 8A:
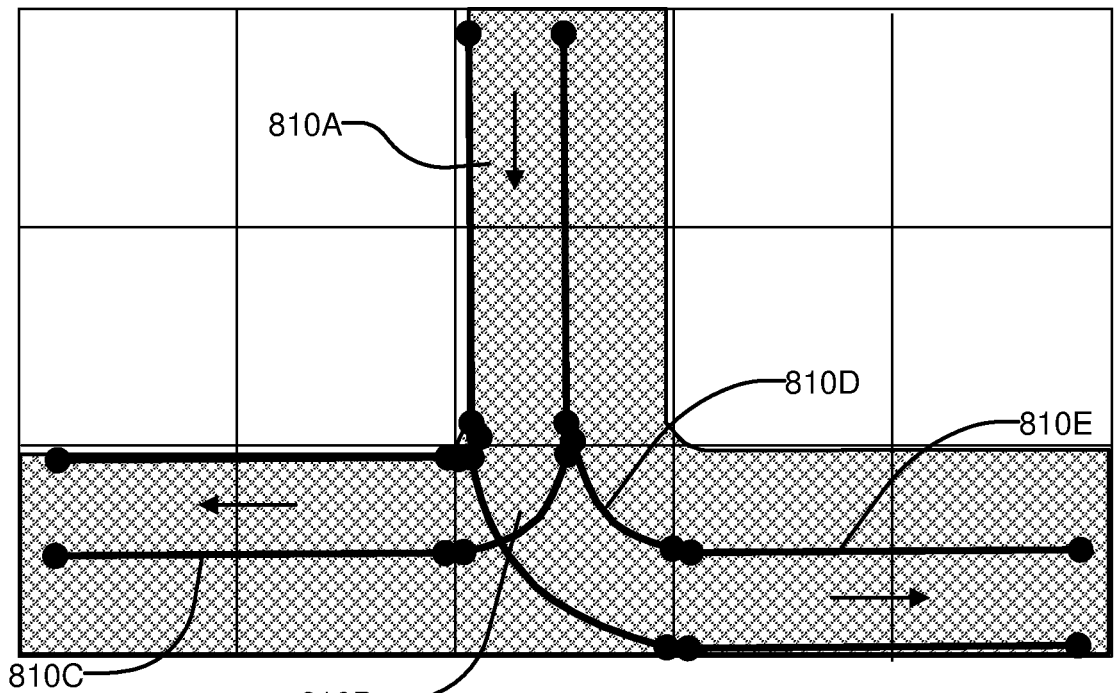
FIGS. 8A-B illustrates lane elements and relations between lane elements in an HD map, according to an embodiment.
Figure 8B:
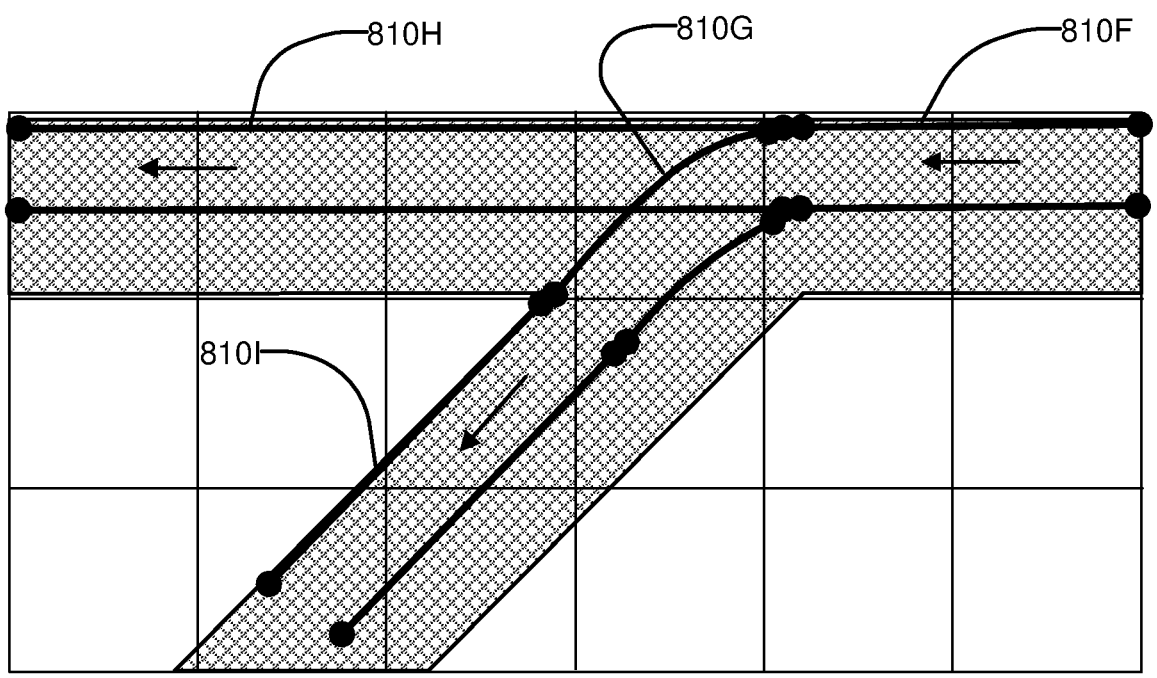

FIGS. 8A-B illustrates lane elements and relations between lane elements in an HD map, according to an embodiment. FIG. 8A shows an example of a T junction in a road illustrating a lane element 810A that is connected to lane element 810C via a turn lane 810B and is connected to lane 810E via a turn lane 810E. FIG. 8B shows an example of a Y junction in a road showing label 810F connected to lane 810H directly and connected to lane 810I via lane 810G. The online HD map system 110 determines a route from a source location to a destination location as a sequence of connected lane elements that can be traversed to reach from the source location to the destination location.

Encoding Entities of Geographical Regions

The map data encoding module 530 encodes the geographic regions of the HD map. Each encoded geographic region includes the positional data of the entities (e.g., road signs, stoplights, etc.) within the geographic region that can impact how the vehicle 150 drives. Thus, the encoded HD map can be more efficiently stored and transmitted to a vehicle 150 for use. In various embodiments, the map data encoding module 530 can further breakdown each geographic region 600 into local sectors, each local sector of the geographic region 600 including a portion of a road. In various embodiments, a local sector is a 1 km×1 km area in a geographical region. Although the subsequent description refers to encoding information within a geographical region 600, the description can also be applied for encoding information within a local sector of the geographic region 600.

Generally, for each geographical region 600, the map data encoding module 530 encodes information describing entities within the geographical region 600 such that the vehicle 150 can appropriately navigate the road using the encoded information describing the entities within the geographical region 600. Examples of entities within a geographical region can include road signs (e.g., stoplight, stop sign, yield, pedestrian crossing, etc.), obstacles (e.g., trees, pedestrians, other cars, etc.), and road features (e.g., road centerline, road lanes, lane elements as described above in FIG. 8A/8B, road borders, road curbs, zones etc.).

Figure 9A:
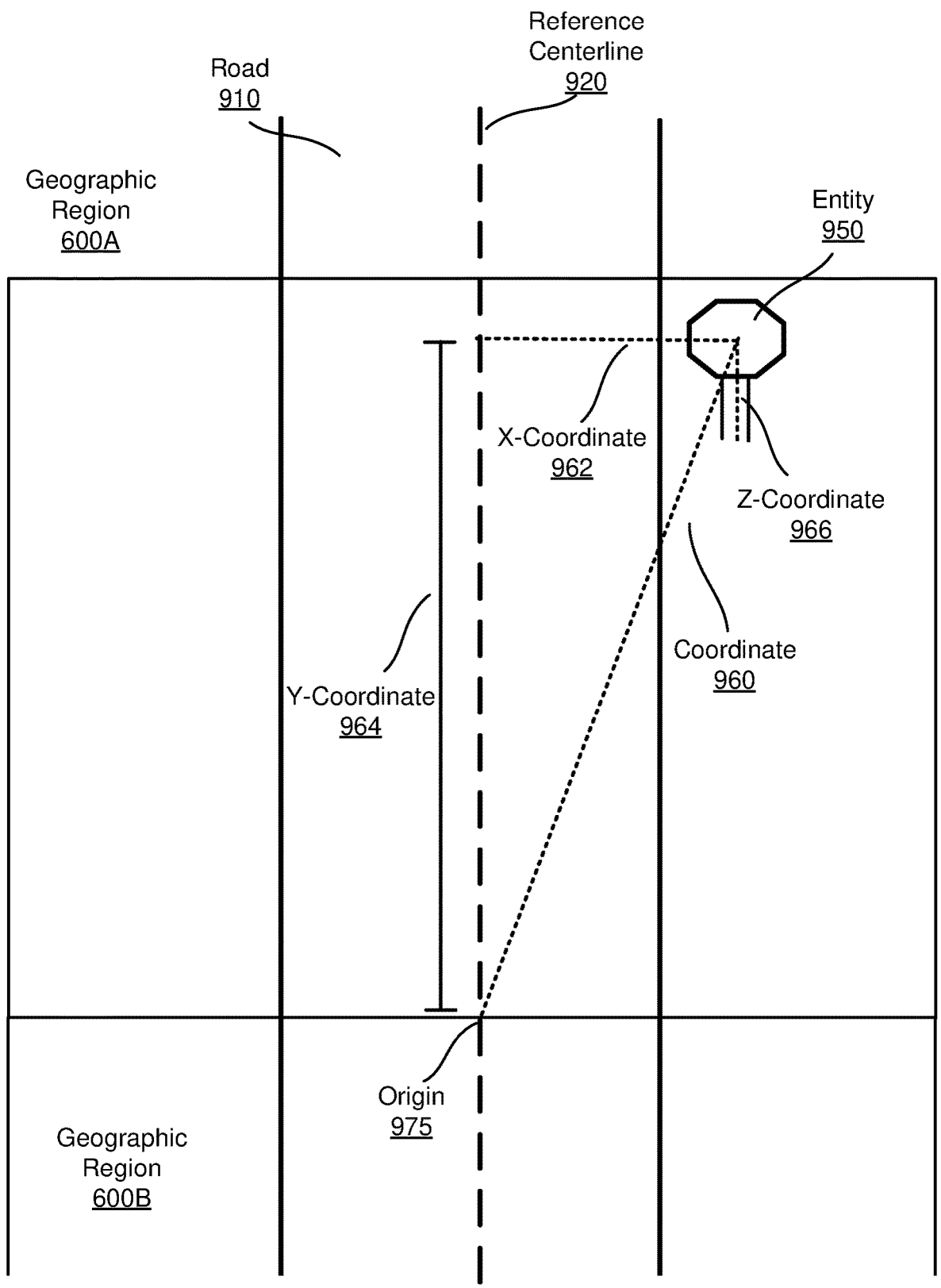
FIG. 9A illustrates example coordinates used to define positions of entities in geographic regions, according to an embodiment.

FIG. 9A illustrates example coordinates 960 that define a position of an entity 950 in a geographic region 600, according to an embodiment. Each geographical region 600 includes a road 910 along with one or more entities 950. The road 910 depicted in FIG. 9A is straight; however, in various embodiments, the road 910 can have one or multiple curves within the geographic region 600A. Additionally, one entity 950 is shown in FIG. 9A for simplicity. However, in various embodiments, numerous entities 950 are included in a geographic region 600A.

The map data encoding module 530 generates a reference centerline 920 for the geographic region 600A. In various embodiments, the reference centerline 920 for the geographic region 600A is dependent on the road 910. As an example, the reference centerline 920 tracks along a road line of the road 910 (e.g., the solid, double yellow line of the road 910). As another example, the reference centerline 920 tracks along the geometric center of the road 910. Here, the reference centerline 920 can be independent of a road line of the road 910. For example, if a road 910 has three total lanes (e.g., two lanes in a first direction and one lane in a second direction), the reference centerline 920 can be located equidistant from the sides of the road 910. In various embodiments, the map data encoding module 530 further defines an origin 975 point that is dependent on the reference centerline 920. For example, as shown in FIG. 9A, the origin 975 is located where the reference centerline 920 is initiated within the current geographic region 600A. The map data encoding module 530 encodes the reference centerline 920 of the geographical region 600A.

For each entity 950 in the geographical region 600A, the map data encoding module 530 determines coordinates 960 for the entity 950 that defines the three dimensional position of the entity 950 within the geographical region 600A. Generally, the coordinate 960 for each entity 950 is determined relative to the reference centerline 920. For example, as shown in FIG. 9A, the coordinate 960 for each entity 950 is in relation to the origin 975, which is dependent on the reference centerline 920.

In various embodiments, a coordinate 960 for an entity 950 can include an x-coordinate 962 value, a y-coordinate 964 value, and a z-coordinate 966 value. The x-coordinate 962 value can be the lateral distance between the entity 950 and the reference centerline 920. In various embodiments, the lateral distance is the distance of an orthogonal line (i.e., orthogonal to the reference centerline 920) between the reference centerline and the entity 950. The y-coordinate 964 value can be a distance along the reference centerline 920. In one embodiment, the y-coordinate 964 value is the distance that tracks the reference centerline 920. Therefore, if the reference centerline 920 is curved, the y-coordinate 964 value includes the curvature of the reference centerline 920. In another embodiment, the y-coordinate 964 value is the vertical distance from the origin 975 of the geographic region 600A. As shown in FIG. 9A, the y-coordinate 964 is the distance along the reference centerline 920 from the origin 975. The z-coordinate 966 can refer to the height of the entity 950 in the geographic region 600.

In various embodiments, a coordinate 960 for an entity 950 can be differently expressed. For example, each coordinate 960 can include a radial distance from the origin 975 and an angle θ that is expressed in relation to the origin 975. Additionally, each coordinate 960 can include a second angle ϕ that describes the slope of a line between the origin 975 and a top point of the entity 950. In other words, the second angle ϕ defines the height of the entity 950.

Generally, representing the three dimensional position of each entity 950 using the coordinate 960 that is in relation to a reference centerline 920 of a geographical region 600 enables a more efficient compression of the three dimensional position of the entity 950 in comparison to conventional methods which use the longitude and latitude positions of an entity 950.

The map data encoding module 530 may construct feature vectors that include the three dimensional positional data of entities 950 of the geographical region 600. In one embodiment, a feature vector includes three dimensional positional data of all entities 950 within a geographical region 600. In some embodiments, the entities 950 of a geographical region 600 whose three dimensional positional data are included in a common feature vector are relevant for a particular lane on the road 910. In other words, each feature vector is specific for a lane on the road 910. For example, if a vehicle 150 is driving down a lane on the road 910, entities 950 that are relevant for that lane can include a sign that is facing the lane, a curb adjacent to the lane, a lane element that defines the edge of the lane, and the like. Additional entities such as a stoplight that is facing a different lane or a curb on the opposite side of the road are not relevant for the lane on the road 910 and therefore, the three dimensional positional data of these additional entities would not be included in the feature vector for the lane. Organizing the positional data of relevant entities in feature vectors enables a vehicle 150 that receives a geographical region of an HD map to rapidly identify the entities that are relevant for the vehicle 150 based on the lane of the road that the vehicle is currently traveling in.

The map data encoding module 530 encodes the three dimensional position of each entity 950 in each geographic region 600A. In various embodiments, the map data encoding module 530 encodes the feature vectors that each includes three dimensional positions of entities 950 that are relevant for a lane in the road. Although the subsequent description is in relation to a single entity, the description can also apply to multiple entities in a feature vector.

Figure 9B:
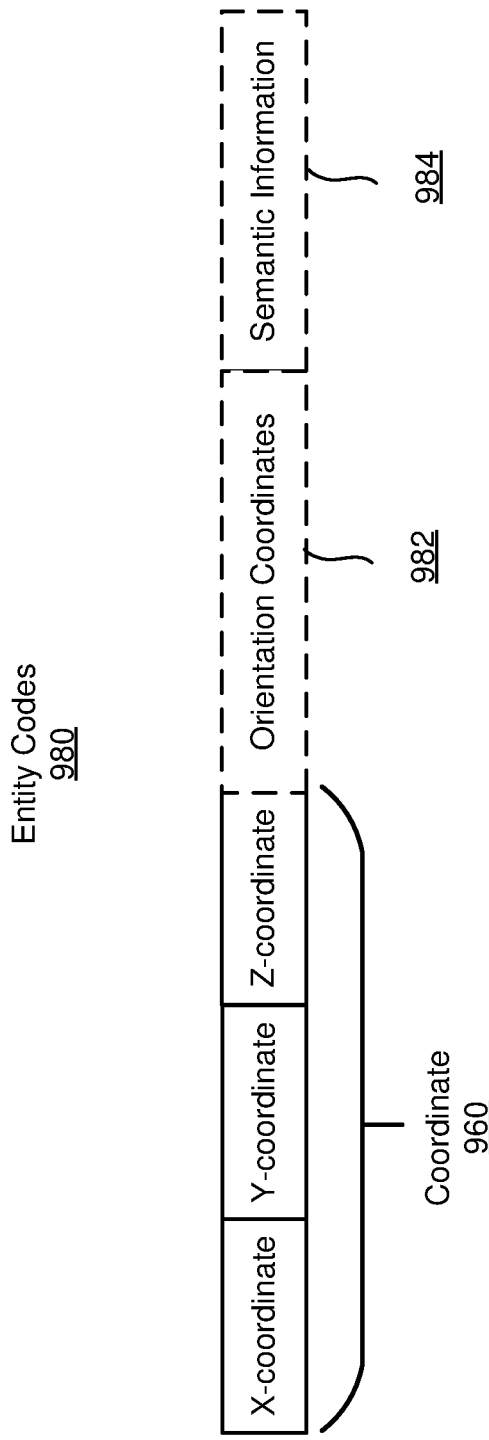
FIG. 9B depicts example codes used to represent an entity in a geographic region, according to the embodiment shown in FIG. 9A.

Reference is made to FIG. 9B, which depicts example entity codes 980 used to represent an entity 950 in a geographic region 600A, according to the embodiment shown in FIG. 9A. The entity codes 980 for the entity 950 can include the three dimensional position (e.g., coordinate 960) of the entity 950. Optionally, the entity codes 980 further includes orientation coordinates 982 and/or semantic information 984 describing the entity 950. Here, the codes representing the orientation coordinates 982 and semantic information 984 can be appended to the codes representing the coordinate 960 of the entity 950.

As shown in FIG. 9B, the coordinate 960 of an entity 950 includes the x-coordinate, y-coordinate, and z-coordinate values. Here, given that the x-coordinate and y-coordinate are expressed in relation to the reference centerline 920, an encoding of each of the x-coordinate and y-coordinate can consume fewer bits in comparison to an encoding of an x-coordinate and y-coordinate that are expressed as longitude or latitude coordinates. In one embodiment, each of the x-coordinate and y-coordinate for an entity can be expressed using 11 bits while the z-coordinate can be expressed in 10 bits. This enables the representation of distances at or near 2 cm precision within the geographical map. In these embodiments, the coordinate 960 of an entity 950 can be represented in 32 total bits. In comparison, using longitude and latitude coordinates to describe a three dimensional position of an entity 950 would typically require upwards of 64 bits.

In some embodiments, the map data encoding module 530 determines three dimensional positions of each entity within a local sector within a geographical region (e.g., multiple local sectors within a geographical region). In these embodiments, a coordinate 960 of an entity 950 within a local sector may be expressed in even fewer bits (e.g., 16 bits) as the coordinate 960 of the entity 950 is described in relation to a reference centerline of the local sector. In other words, the values of the x-coordinate and y-coordinate of an entity, in relation to a reference centerline of the local sector, can be represented using fewer bits in comparison to the values of the x-coordinate and y-coordinate of an entity that are determined in relation to a reference centerline of a geographic region.

Returning to FIG. 9B, the orientation coordinates 982 of an entity 950 describe the orientation of the entity 950. Examples of orientation coordinates 982 include a 3D normal vector that indicates the position that the entity 950 is facing or a 3D vector that indicates the upward direction of an entity 950. The orientation coordinates 982 are beneficial for describing the orientation of an entity 950 such as a road sign. Therefore, a vehicle 150 that receives the orientation coordinates 982 can respond appropriately to a road sign that is facing the vehicle 150. For some entities 950, such as road lines or road zones, the entity codes 980 of the entity 950 need not include the orientation coordinates 982.

In various embodiments, codes describing the semantic information 984 of an entity 950 can be included in the entity codes 980. The semantic information 984 provide information about the entity 950. For example, if the entity 950 is a road sign, the semantic information 984 can describe a type of the road sign (e.g., stop sign, yield sign, pedestrian sign). As another example, the semantic information 984 can describe a shape or dimensions of the road sign. If the entity 950 is a road line, such as a lane element, the semantic information 984 can describe a lane relationship or a lane restriction. Lane relationships can be relationship information between entities (e.g., lane element, boundary, and signs). For example, a lane relationship describes a relationship between the lane element and an additional entity. Lane relationships for the lane element include lane elements to the left or right, lane elements in and out, signs associated with lane element (speed limit) or lane termination (stop). Lane restrictions can indicate a direction, speed, type of lane (for example, a lane for going straight, a left turn lane, a right turn lane, an exit lane, and the like), restriction on crossing to the left, connectivity to other lanes, edge or road.

For each geographic region 600, the map data encoding module 530 compiles the codes representing the entities 950 and the codes representing the reference centerline 920 of the geographic region 600 and generates compressed codes for the geographic region 600. In various embodiments, the map data encoding module 530 compiles the codes representing entities 950 within a common feature vector and further compiles the codes across the feature vectors with the codes representing the reference centerline 920 to generate compressed codes for the geographic region 600. The map data encoding module 530 can generate the compressed codes by employing a standard compression method. Examples of standard compression methods include PKZIP, Gzip, and PNG. Each of the compressed codes for a geographic region 600 can be stored as a partition of the HD map. Therefore, when a vehicle 150 is entering into a particular geographic region, the online HD map system 110 can retrieve and provide the compressed codes for that geographic region to the vehicle 150.

Figure 9C:
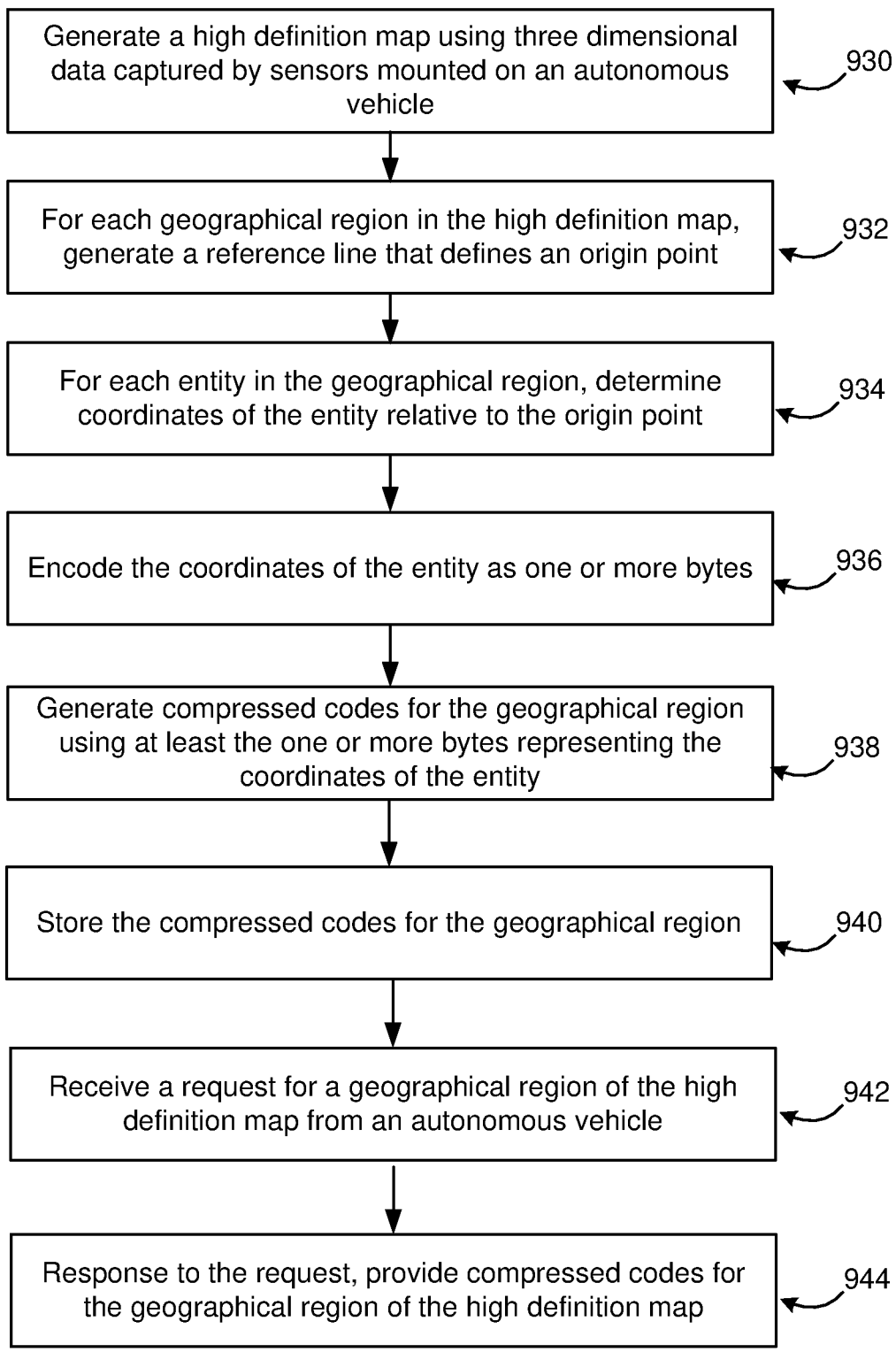
FIG. 9C is a flow diagram for encoding entities in a geographic region, according to an embodiment.

FIG. 9C is a flow diagram for encoding entities 950 in a geographic region 600, according to an embodiment. The online HD map system 110 generates 930 a HD map using three dimensional data captured by vehicle sensors 105 mounted on autonomous vehicles 150. In various embodiments, the HD map includes multiple geographic regions 600. For each geographic region 600, the online HD map system 110 generates a reference line that defines an origin point. For each entity in the geographic region 600, the online HD map system 110 determines 934 coordinates 960 of the entity 950 relative to the origin 975. The online HD map system 110 encodes 936 the coordinates 960 of the entity 950 as one or more bytes. As an example, the online HD map system 110 encodes an x-coordinate of the entity 950 using 11 bits, the y-coordinate of the entity 950 using 11 bits, and the z-coordinate of the entity 950 using 10 bits. This enables a 2 cm precision within the HD map. The online HD map system 110 generates 938 compressed codes for the geographical region 600 using at least the one or bytes representing the coordinates of the entity 950. The online HD map system 110 stores 940 the compressed codes for the geographical region.

An autonomous vehicle 150 may travel through a region that corresponds to a geographical region of the HD map. The online HD map system 110 receives 942 a request for the geographical region of the HD map from the autonomous vehicle. In response to the request, the online HD map system 110 provides 944 the compressed codes for the geographical region of the HD map. Therefore, the autonomous vehicle can use the compressed codes for the geographical region to guide the driving by the autonomous vehicle.

Computing Machine Architecture

Figure 10:
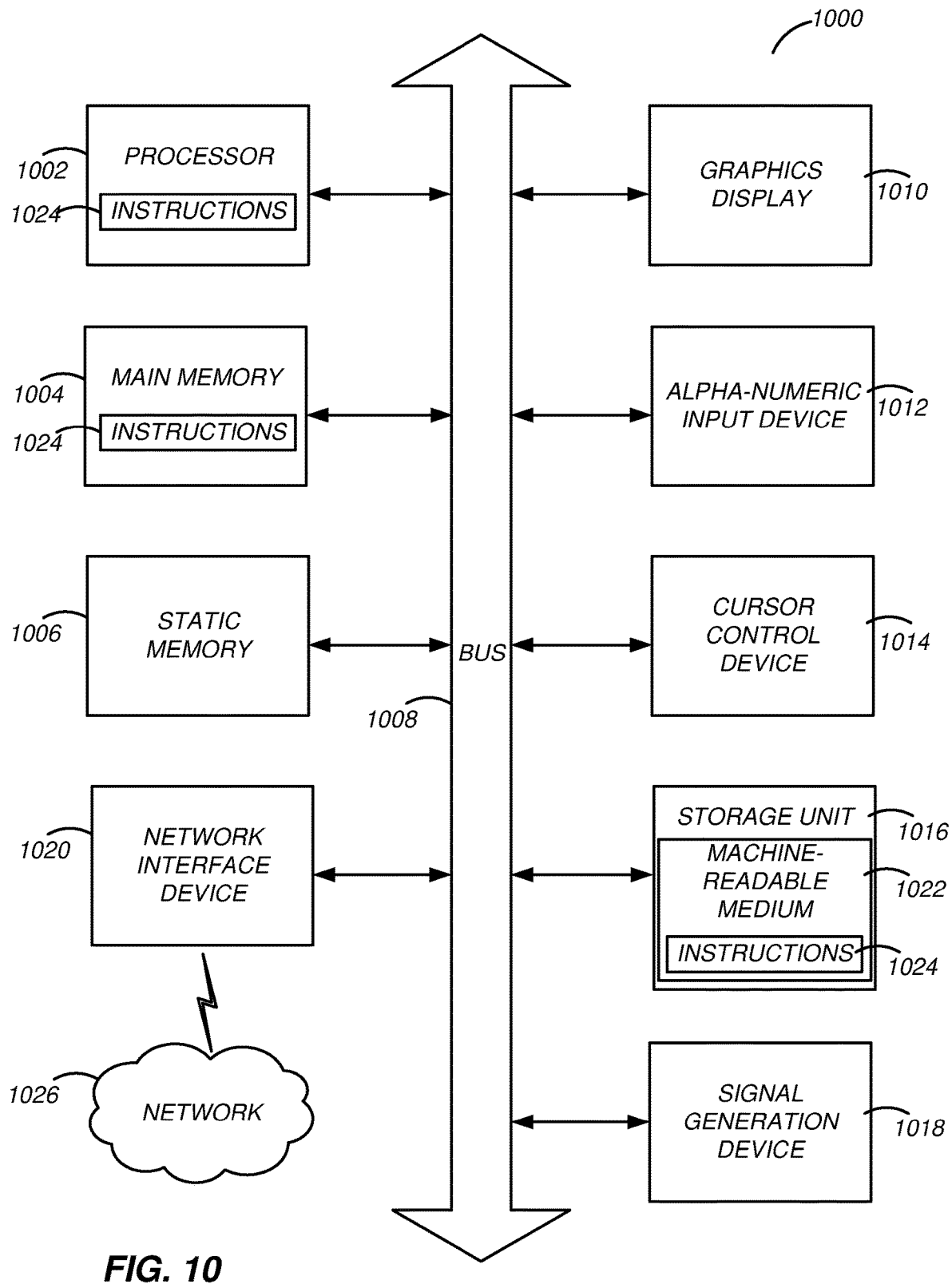
FIG. 10 is a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

EXAMPLES

Example 1: Improved Compression Ratio Using Image Representations of 3D Data

A 20 min track from the KITTI Vision Benchmark Suite was used for testing. The first scan of the track was used for computing the calibration parameters, and scans 100, 1000, and 5000 are encoded using the parameters determined from scan 0. The KITTI dataset was previously collected at 10 Hz, so subsequent scans 100, 1000, and 5000 are 10 seconds, 100 seconds, and 500 seconds away from scan 0.

Each positional data (x, y, z) and data associated with each positional data (intensity) was encoded using the process flow shown in FIG. 2A and then subsequently reconstructed from its encoded form. Here, the reconstructed positional data are referred to as (x', y', z'). Reconstruction error of the positional data is defined as:

$$\sqrt{(x-x')^2+(y-y')^2+(z-z')^2} \quad (6)$$

Similarly, the reconstructed intensity is referred to as (intensity'). Reconstruction error of the intensity is defined as:

$$(\text{intensity}-\text{intensity'}) \quad (7)$$

The tables below report mean, median, and 99-percentile errors across the different scans.

TABLE 1

Error introduced by encoding (x, y, z) by (pitch, yaw, range) and global calibration parameters.

| ScanId | 0 (train) | 100 (test) | 1000 (test) | 5000 (test) |
|---|---|---|---|---|
| Mean error | 0.24902 cm | 0.218433 cm | 0.187907 cm | 0.27288 cm |
| Median error | 0.18878 cm | 0.164285 cm | 0.118222 cm | 0.178444 cm |
| 99 perc error | 1.28408 cm | 0.783367 cm | 1.07856 cm | 1.96824 cm |

TABLE 2

XYZ compression error with lossy image compression using WebP. Numbers are reported for scan 5000. Pixels are compacted to achieve better compression quality. The three channels (two for range and one for intensity) are compressed separately. The most significant byte of range is encoded with lossless compression. The least significant byte of range is encoded with lossy compression. The baseline size for this channel (using WebP lossless compression) is 118 KB. This table reports size and error for range. See Table 3 for report for intensity.

| Compression quality | Mean error | Median error | 99 percent error | Compressed size |
|---|---|---|---|---|
| 100 (best lossy) | 0.329029 cm | 0.255335 cm | 1.9737 cm | 110 KB (93%) |
| 90 | 0.512838 cm | 0.443135 cm | 2.02676 cm | 75 KB (64%) |
| 80 | 0.752869 cm | 0.645082 cm | 2.38107 cm | 60 KB (51%) |
| 70 | 0.954499 cm | 0.805274 cm | 2.92311 cm | 53 KB (45%) |
| 60 | 1.06045 cm | 0.886231 cm | 3.31717 cm | 50 KB (42%) |
| 50 | 1.17177 cm | 0.974888 cm | 3.71841 cm | 47 KB (40%) |

TABLE 3

Similar to Table 2 but measuring compression size and error for intensity channel. The baseline size for the intensity channel (using WebP lossless compression) is 71 KB. Intensity error is measured by the absolute difference between original and decoded intensity. Remember that intensity value ranges in [0, 1] (e.g., if original intensity is 0.42 and decoded is 0.418, then error is 0.002).

| Compression quality | Mean error | Median error | 99 perc error | Compressed size |
|---|---|---|---|---|
| 100 (best lossy) | 0.00205966 | 0.00125 | 0.00890625 | 90 KB (127%) |
| 90 | 0.00646633 | 0.00484374 | 0.02375 | 57 KB (80%) |
| 80 | 0.0118004 | 0.00921875 | 0.0432813 | 43 KB (61%) |
| 70 | 0.0158456 | 0.0121875 | 0.0590625 | 36 KB (51%) |
| 60 | 0.018197 | 0.014375 | 0.06875 | 33 KB (46%) |
| 50 | 0.0208268 | 0.01625 | 0.0782813 | 30 KB (42%) |
| 40 | 0.0239308 | 0.0189063 | 0.0915625 | 26 KB (37%) |
| 30 | 0.029052 | 0.0225 | 0.114844 | 22 KB (31%) |
| 20 | 0.0353781 | 0.0265625 | 0.143438 | 17 KB (24%) |
| 10 | 0.0437468 | 0.031875 | 0.183281 | 12 KB (17%) |

Table 4: Total data size (KB) and compression ratio using different compression levels on range (least significant byte) and intensity. Numbers are reported for scan 5000. The total data size is computed by adding losslessly compressed size of the most significant byte of range (19 KB), the lossy compressed size of the least significant byte of range (from Table 2), the lossy compressed size of intensity (from Table 3), and a bitmap for mapping compacted pixel locations (32 KB). Numbers in the first row show compression level for range (least significant byte) and numbers in the first column show compression level for intensity. Number in each cell shows total data size (in KB) and compression ratio in parenthesis. This table should be used in with Tables 2 and 3 to find the best tradeoff between compression ratio and error.

|  | Range | | | | | |
|---|---|---|---|---|---|---|
|  | 100 | 90 | 80 | 70 | 60 | 50 |
| Intensity 100 | 251 (13%) | 216 (11%) | 201 (11%) | 194 (10%) | 191 (10%) | 188 (10%) |
| 90 | 218 (12%) | 183 (10%) | 168 (9%) | 161 (9%) | 158 (8%) | 155 (8%) |
| 80 | 204 (11%) | 169 (9%) | 154 (8%) | 147 (8%) | 144 (8%) | 141 (7%) |
| 70 | 197 (10%) | 162 (9%) | 147 (8%) | 140 (7%) | 137 (7%) | 134 (7%) |
| 60 | 194 (10%) | 159 (8%) | 144 (8%) | 137 (7%) | 134 (7%) | 131 (7%) |
| 50 | 191 (10%) | 156 (8%) | 141 (7%) | 134 (7%) | 131 (7%) | 128 (7%) |
| 40 | 187 (10%) | 152 (8%) | 137 (7%) | 130 (7%) | 127 (7%) | 124 (7%) |
| 30 | 183 (10%) | 148 (8%) | 133 (7%) | 126 (7%) | 123 (7%) | 120 (6%) |
| 20 | 178 (9%) | 143 (8%) | 128 (7%) | 121 (6%) | 118 (6%) | 115 (6%) |
| 10 | 173 (9%) | 138 (7%) | 123 (7%) | 116 (6%) | 113 (6%) | 110 (6%) |

Conventional Encoding Method: Byte Encoding

The variables of (x, y, z, intensity) can be expressed using a baseline total of 16 bytes (e.g., 4 bytes for each variable). Conventional byte encoding includes encoding (x, y, z) with 2 bytes each and intensity with 1 byte. The three dimensional positional variables (x, y, z) each ranges within [−120, 120]. A step value of 0.4 cm is used to express each three dimensional positional variable using 2 bytes (16 bits) each. Additionally, intensity ranges within [0, 1]. Therefore, using a step value of 1/256, the intensity can be expressed using 1 byte. Thus each point is encoded with 7 bytes. This provides for a compression ratio of 7/16=44%.

Conventional Encoding Method: Zlib Compression

Here, the variables of (x, y, z, intensity) can still be expressed using a baseline total of 16 bytes. Here, a combination of byte encoding, as described above, is combined with column-compress sequence of (x, y, z) and intensity values. Zlib compression is lossless so this doesn't introduce more error beyond byte encoding, and column-compression takes full advantage of contiguous values in X/Y/Z/I axis. The compression achieved using Zlib compression techniques is shown in Table 5.

TABLE 5

Compression ratio for each variable using Zlib compression techniques.

| | X | Y | Z | I |
|---|---|---|---|---|
| Size reduction | 26% | 30% | 48% | 41% |

As described above in relation to the byte encoding method, the variables of x, y, and z can each be expressed by 2 bytes whereas intensity can be expressed using 1 byte. Each of the variables can be further compressed using ZLib compression by the amounts shown in Table 5. Thus, the variables of x, y, and z can be expressed by 1.48 bytes, 1.4 bytes, and 1.04 bytes, respectively. The intensity can be expressed using 0.59 bytes. On average, this results in a summated total of 4.51 bytes, which represents a 28% compression ratio (e.g., 4.51 bytes divided by the baseline of 16 total bytes).

Conventional Encoding Method: Octree Compression

Point cloud library (PCL) offers octree-based compression. Octree-based compression is used to compress (x, y, z) so the intensity may be compressed separately (e.g., using byte encoding or Zlib above). For (x, y, z) octree achieves a 86-89% (depending on octant size) reduction with sub-cm accuracy.

TABLE 6

Compression ratio and corresponding error using the Octree Compression method.

| Data reduction | Mean err (cm) | Median err(cm) | 90-perc err (cm) | 99-perc err (cm) |
|---|---|---|---|---|
| 91% | 1.00 | 1.02 | 1.35 | 1.57 |
| 89% | 0.54 | 0.55 | 0.71 | 0.81 |
| 86% | 0.27 | 0.27 | 0.35 | 0.41 |

Compression ratio: 75% × 11% (XYZ) + 25% × 25% × 59% (I) = 12%

Octree compression has two disadvantages: (1) it loses the row/column (or pitch/yaw) information associated with each point which is useful in map building and localization and (2) it only handles (x, y, z) whereas all other metadata needs to be compressed separately with a much worse compression ratio. When a large number of metadata (e.g., color, normal, semantic labels, and the like) need to be compressed along with the positional data, the size of the compressed encoding is significantly larger.

Example 2: Storage Space for Representing Entities Relative to a Reference Centerline The storage space for representing entities in a one mile length of a road was estimated. A reference road centerline is produced for the road. Here, the reference road centerline can be representing using 2400 bytes per mile. All additional entities in the one mile length of the road are expressed relative to the centerline. By restricting data relative to the centerline of the road, data storage needs are reduced drastically while simultaneously preserving high localization precision.

To store x-coordinates and y-coordinates that satisfy a precision requirement of 2 cm, 30,000 values are required, or less than 16 bits for a single coordinate (32 bits for both x any y). A z-coordinate may be represented more compactly since smaller vertical ranges are typically observed (e.g., 20 m at a precision requirement of 2 cm requires 10 bits). Thus, a single three dimensional position may be represented with 32 bits in this example to achieve a 2 cm accuracy requirement. Referring to the particular entity of a road boundary (e.g., a boundary line), assuming 400 samples over the length of a mile, a total of 1600 bytes/mile is needed to encode the road boundary over the mile of road.

Lane relationships can be relationship information between entities (e.g., lane element, boundary, and signs). Lane relationships include lanes to left or right, lanes in and out, signs associated with lane (speed limit) or lane termination (stop). Assuming a lane element of 50 m, a lane element typically has, 2 sign relationships, 2 in, 2 out relationships, 2 border relationships, and 2 lane neighbor relationships. Therefore, an estimation of 10 total relationships provides for approximately 40 bytes per lane element of 50 m. Altogether, this results in approximately 1280 bytes per lane mile to express the lane relationships.

Lanes also have restrictions. Assuming the lane element of 50 m, the restrictions for a lane element should typically be encodable in 4 bytes. This results in approximately 160 bytes per lane mile.

A road sign is an example of an entity along the one mile length of road. A sign may be represented as a 3D rectangle (where the rectangle is aligned to the surface of the sign and bounds the sign borders tightly) in the road reference coordinates. The details of the sign can be encoded using the following bits/bytes:
- a center point in 3D coordinates (32 bits=4 bytes using road reference coordinates)
- a 3D normal vector (72 bits=6 bytes represented as 3 signed 16 bit integers)
- a 3D vector representing the up direction for the sign (72 bits=6 bytes)
- a height and width (1 byte for each, total 2 bytes, assume 2 m max height, giving a 1 cm precision on width/height)
- a sign type such as a stop or yield sign type (16 bits=2 bytes)

A total of 20 bytes is needed per sign which essentially provides the accurate 3D location. Assuming there are 10 signs per lane mile, this is approximately 200 bytes per lane mile for signs.

Altogether, the total estimation of bytes needed to represent the entities, the reference center lane, and associated information for a 1 mile stretch of road is depicted below in Table 7.

TABLE 7

Estimated total bytes per lane mile to express reference center lane, entities, and associated information.

| For a 2 lane road | Encoded Bytes per mile | Number per Lane Element | Total Bytes per mile |
|---|---|---|---|
| Reference Center Lane | 2400 | 1 | 2400 |
| Lane Boundaries | 1600 | 2 | 3200 |
| Lane Relationships | 1280 | 2 | 2560 |
| Lane Restrictions | 160 | 2 | 320 |
| Signs | 200 | 2 | 400 |
| | | TOTAL for 2 lane miles | 8880 |
| | | Per Lane Mile | 4440 |

These estimations establish a 4.5 KB per lane mile before normal compression. Using conventional methods, a typical estimation yields approximately 10 KB per lane mile or even higher before normal compression. Applying compression, examples of which can be Zlib or other standard data compression methods, can further reduce the estimation to be significantly less than 4.5 KB per lane mile since most lanes move through space with low curvature.

The invention claimed is:

1. A method comprising:
   determining one or more coordinates corresponding to a location of an entity in a region, the one or more coordinates being referenced based at least on a reference line corresponding to the region;
   encoding the one or more coordinates into an entity code;
   generating a compressed entity code based at least on the entity code; and
   annotating map data corresponding to a map that corresponds to the region with the compressed entity code, wherein a machine uses the compressed entity code included in the map data in performing one or more navigation operations in the region.

2. The method of claim 1, further comprising encoding into the entity code one or more of:
   one or more coordinates corresponding to an orientation of the entity in the region; or
   semantic information corresponding to the entity.

3. The method of claim 1, wherein the one or more coordinates are referenced based at least on the reference line by at least being referenced in relation to a reference point that is defined based at least on the reference line.

4. The method of claim 1, wherein the reference line is determined based at least on a centerline of a path that traverses through the region.

5. The method of claim 1, wherein a total amount of data used to encode the one or more location coordinates corresponding to the entity is four or fewer bytes.

6. The method of claim 3, wherein the reference line passes through the reference point.

7. A system comprising:
   one or more processing units to cause performance of operations comprising:
   obtaining a reference line corresponding to a region represented by a map;
   for at least one respective entity of one or more entities included in the region:
   determining one or more respective location coordinates corresponding to the respective entity, the one or more respective location coordinates being referenced based at least on the reference line;
   encoding the one or more respective location coordinates for the respective entity into a respective entity code; and
   providing the respective entity code to a machine, the machine using the respective entity code in performing one or more navigation operations in the region.

8. The system of claim 7, the operations further comprising annotating map data corresponding to the map with the respective entity code that corresponds to the respective entity.

9. The system of claim 7, the operations further comprising encoding, into the respective entity code that corresponds to the respective entity, one or more respective orientation coordinates corresponding to the respective entity, the one or more respective orientation coordinates indicating an orientation corresponding to the respective entity in the region.

10. The system of claim 7, the operations further comprising encoding, into the respective entity code that corresponds to the respective entity, semantic information corresponding to the respective entity.

11. The system of claim 7, the operations further comprising compressing the respective entity code that corresponds to the respective entity to generate a respective compressed code, wherein providing the respective entity code to the machine includes providing the respective compressed code to the machine.

12. The system of claim 11, wherein the compressing is further based at least on the reference line.

13. The system of claim 7, wherein the one or more respective location coordinates are referenced based at least on the reference line by being in relation to a reference point obtained based at least on the reference line.

14. The system of claim 7, wherein the reference line is determined based at least on a centerline of a path that traverses through the region.

15. A processor comprising:
   one or more circuits to cause performance of operations comprising:
   determining one or more location coordinates corresponding to an entity included in a region, the one or more location coordinates being in relation to a reference line corresponding to the region;
   encoding the one or more location coordinates corresponding to the entity into an entity code;
   compressing the entity code to generate a compressed entity code; and
   annotating map data corresponding to a map that corresponds to the region with the compressed entity code, wherein a vehicle uses the compressed entity code included in the map data in performing one or more navigation operations in the region.

16. The processor of claim 15, wherein the entity code further includes encoded therein one or more of:
   one or more orientation coordinates corresponding to the entity, the one or more orientation coordinates indicating an orientation corresponding to the entity in the region; or
   semantic information about the entity.

17. The processor of claim 15, wherein the one or more location coordinates are in relation to the reference line by being referenced in relation to an origin point obtained based at least on the reference line.

18. The processor of claim 15, wherein the reference line is determined based at least on a centerline of a route that traverses through the region.

\* \* \* \* \*